March 28, 1967    J. SIMPSON ET AL    3,310,834
PLASTIC BOTTLE MOLDING MACHINE
Filed Oct. 30, 1963    21 Sheets-Sheet 12
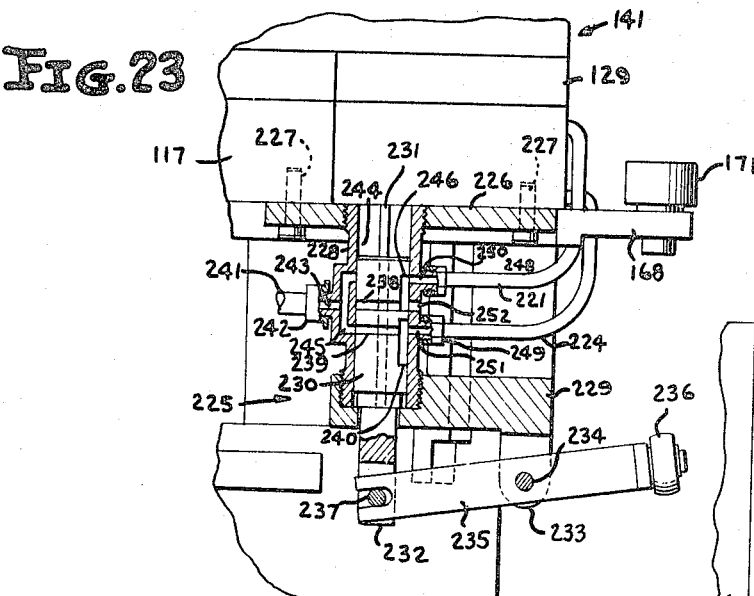
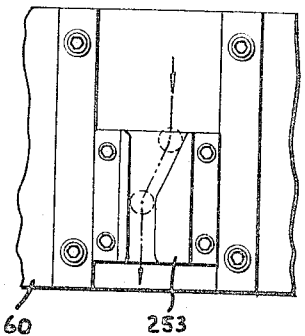
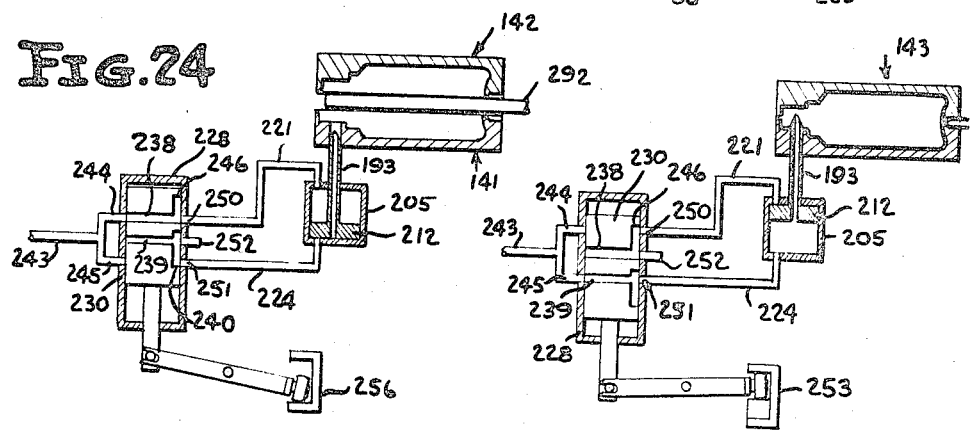
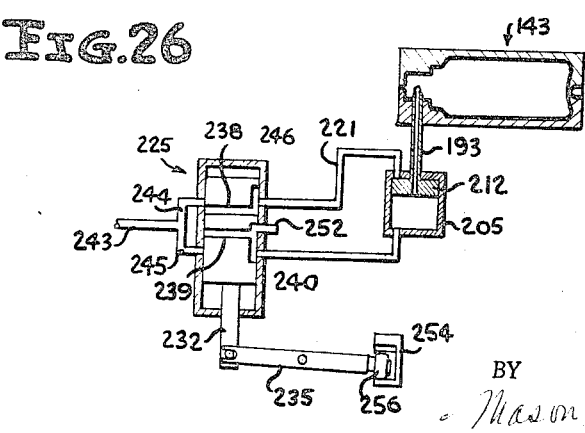
INVENTORS
JUSTIN SIMPSON,
EARL E. GILKESON
& JOHN S. BOZEK
BY
ATTORNEYS

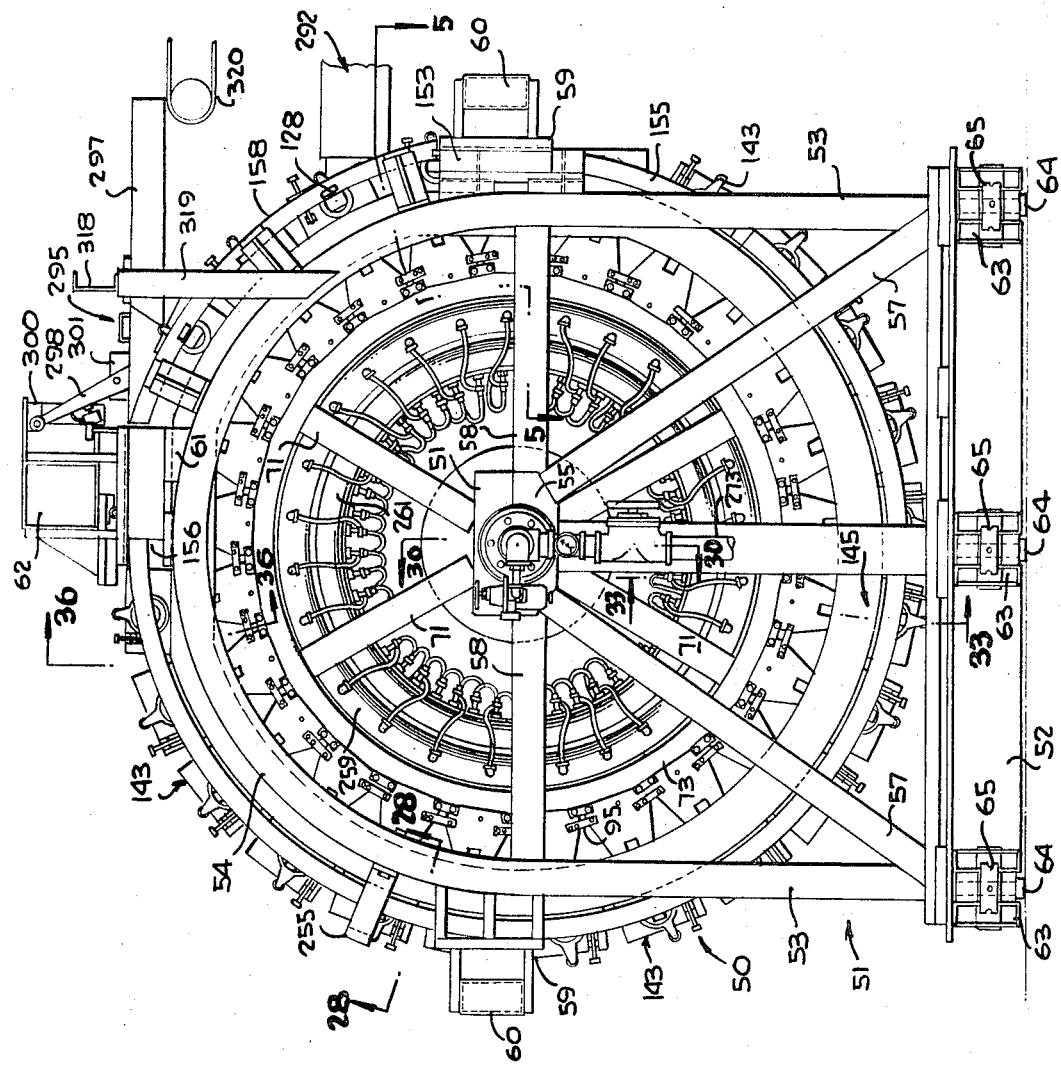

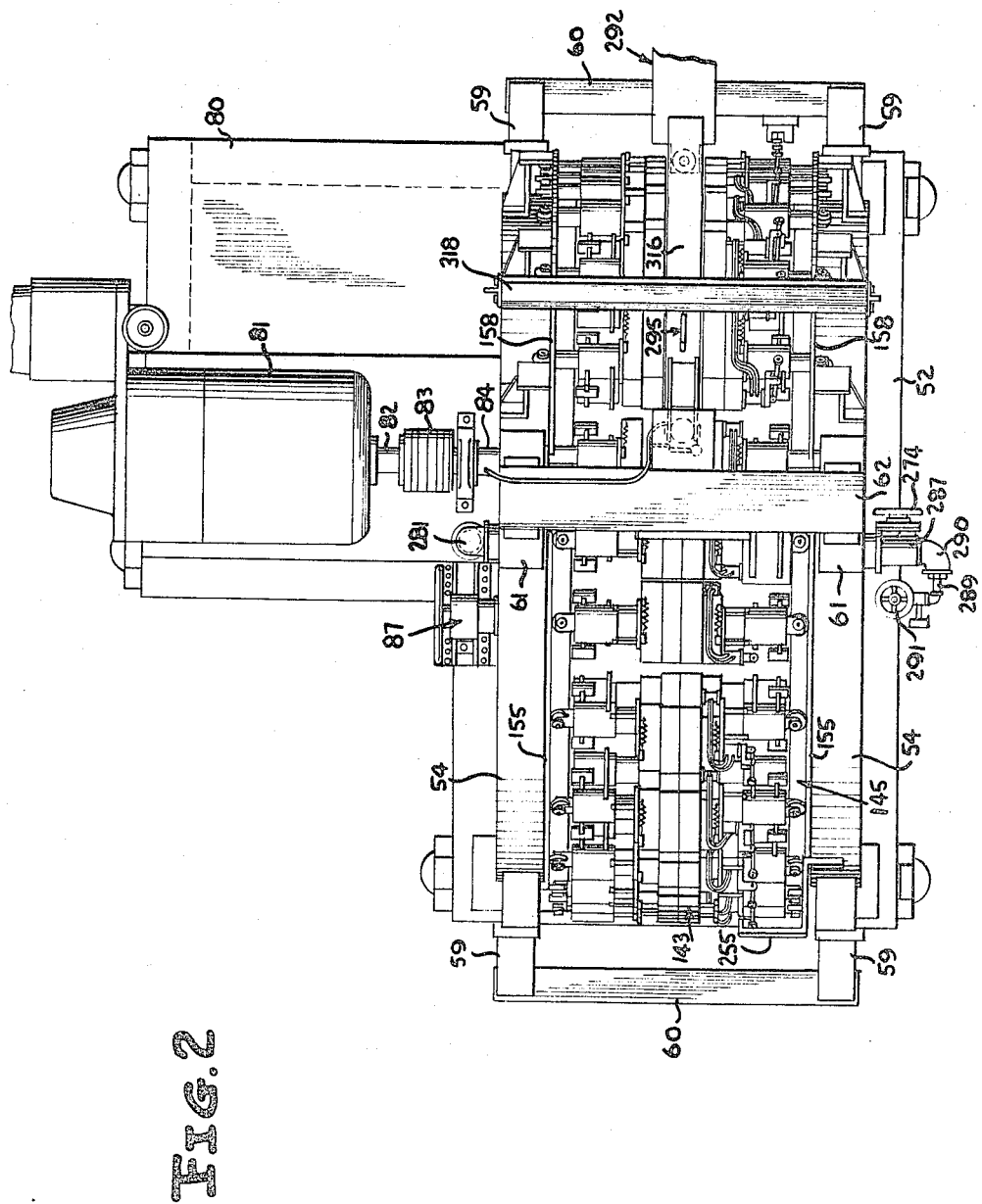

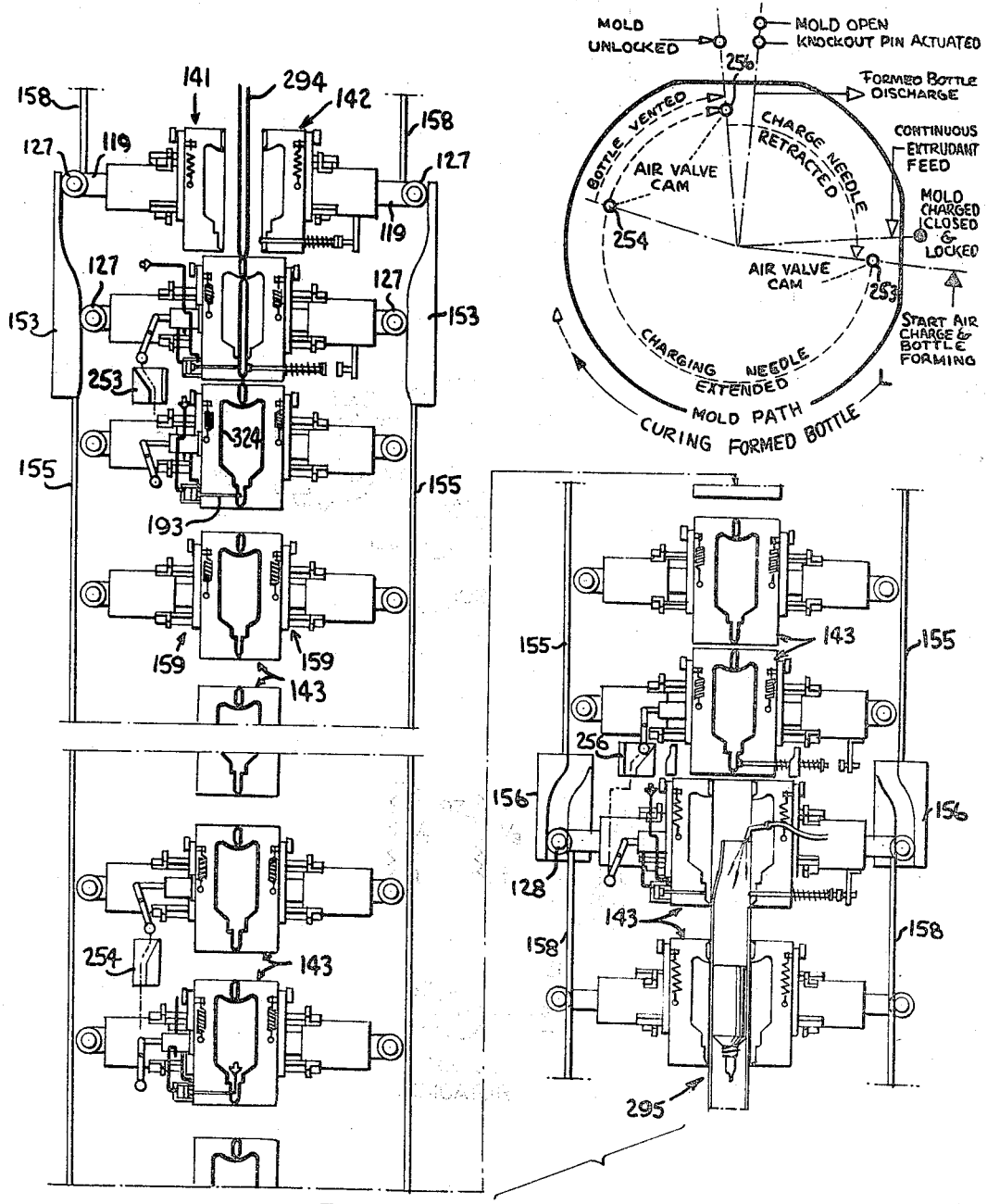

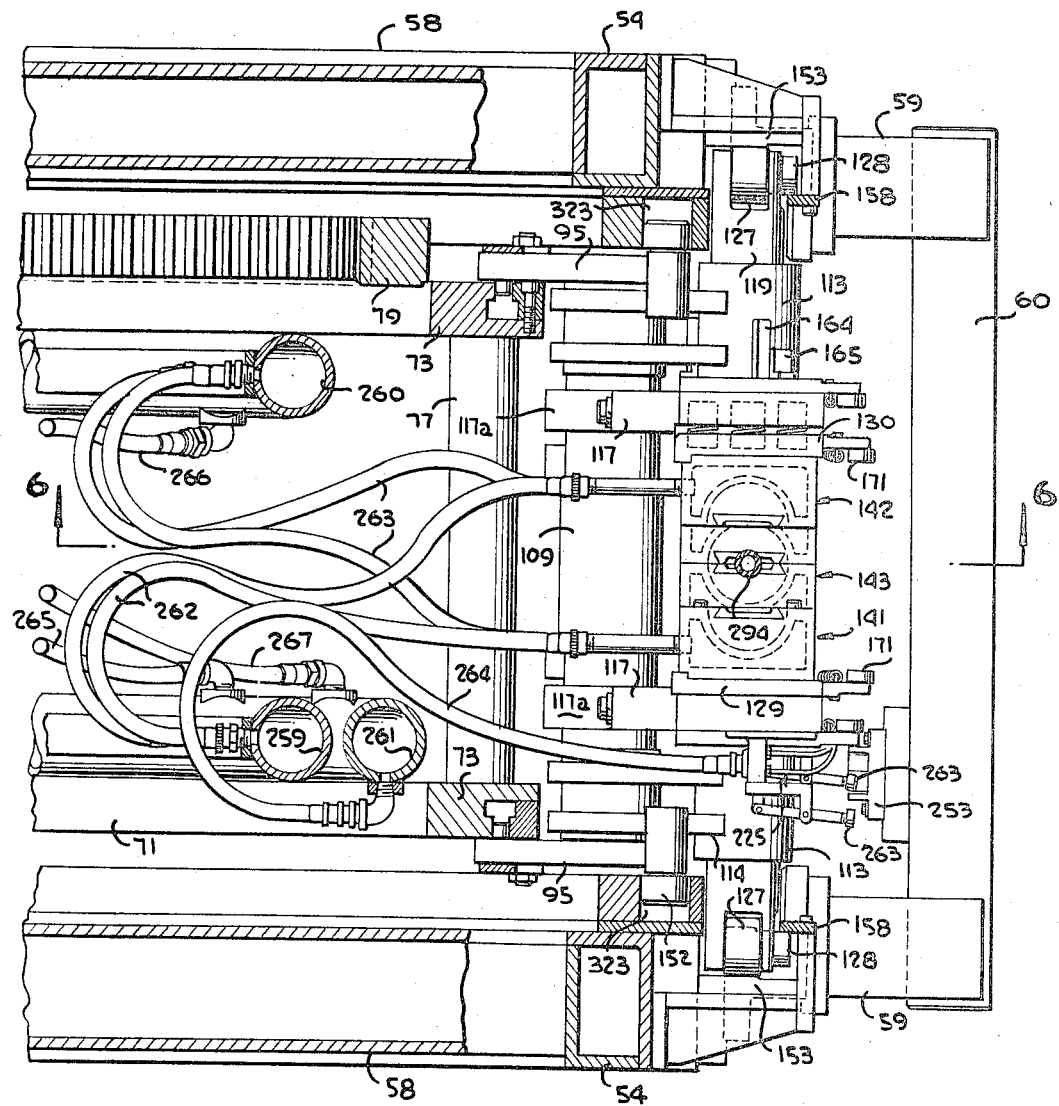

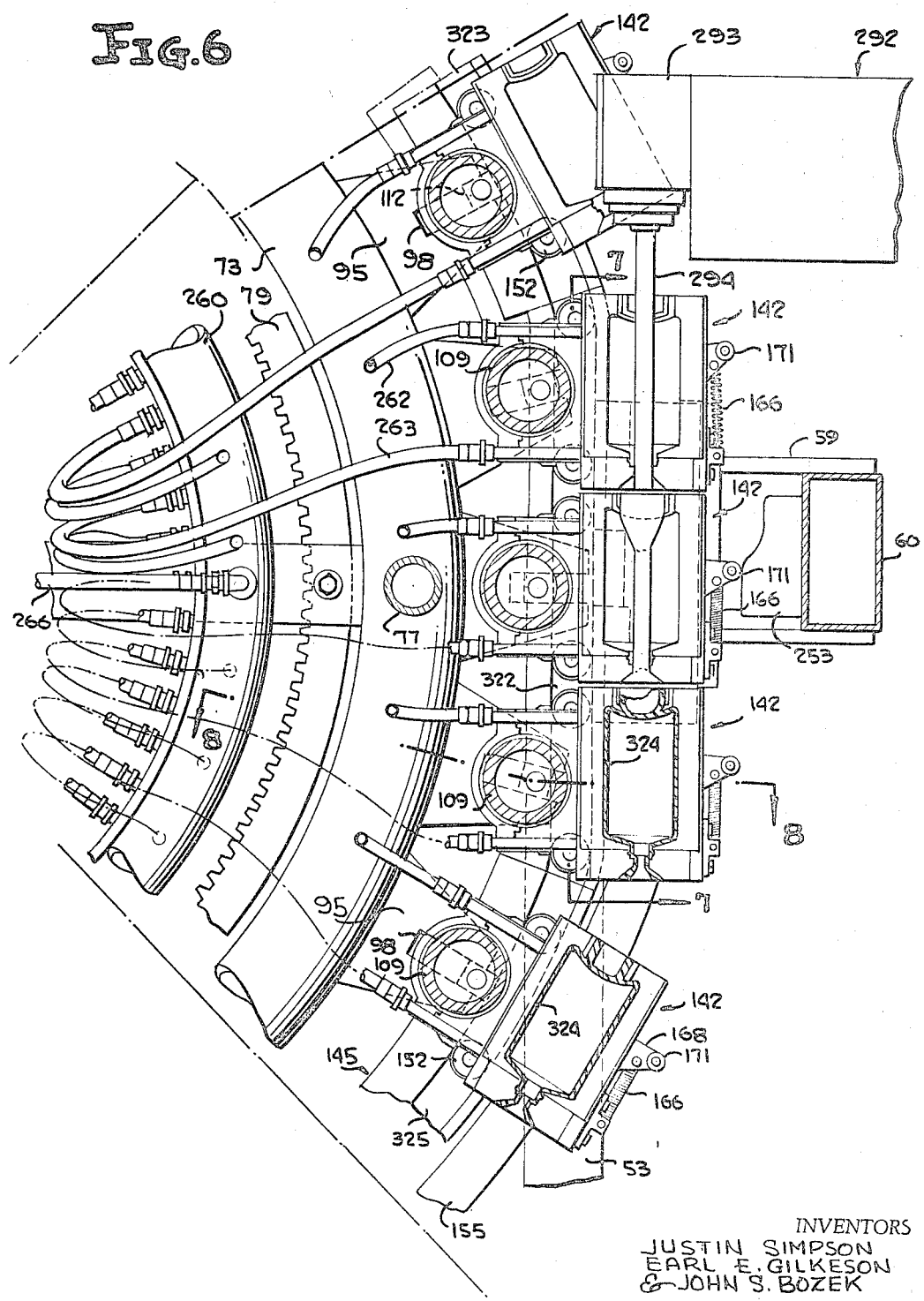

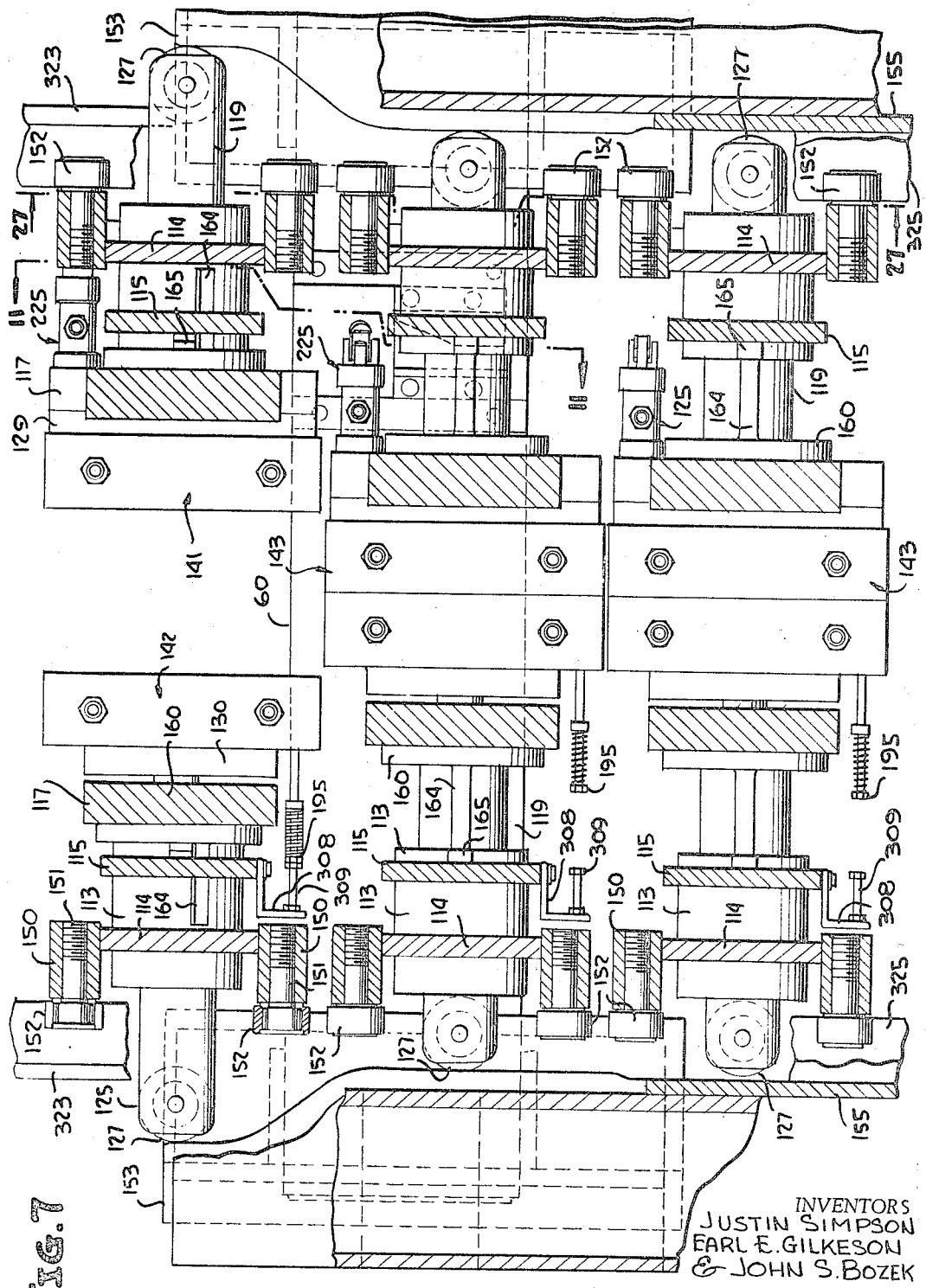

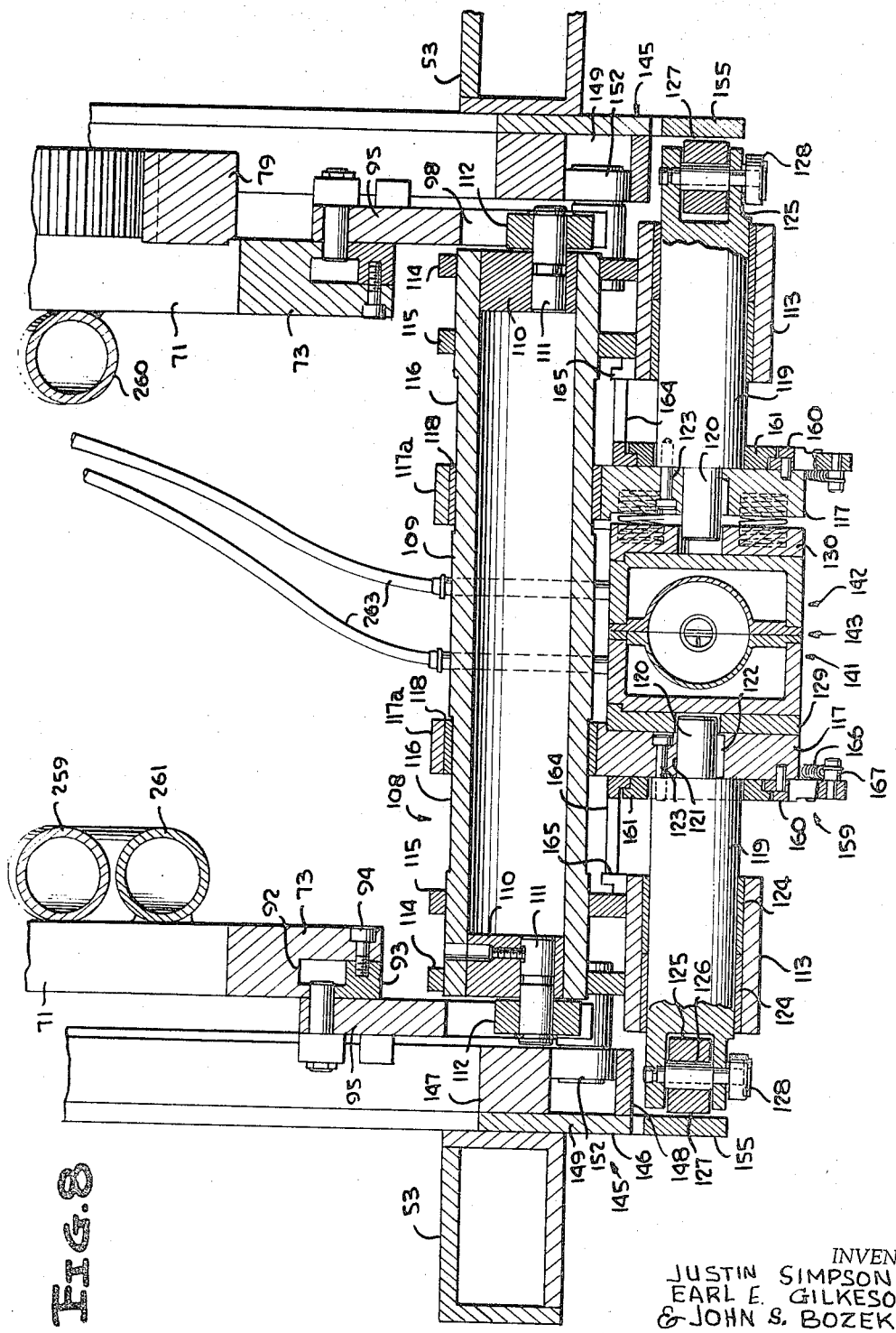

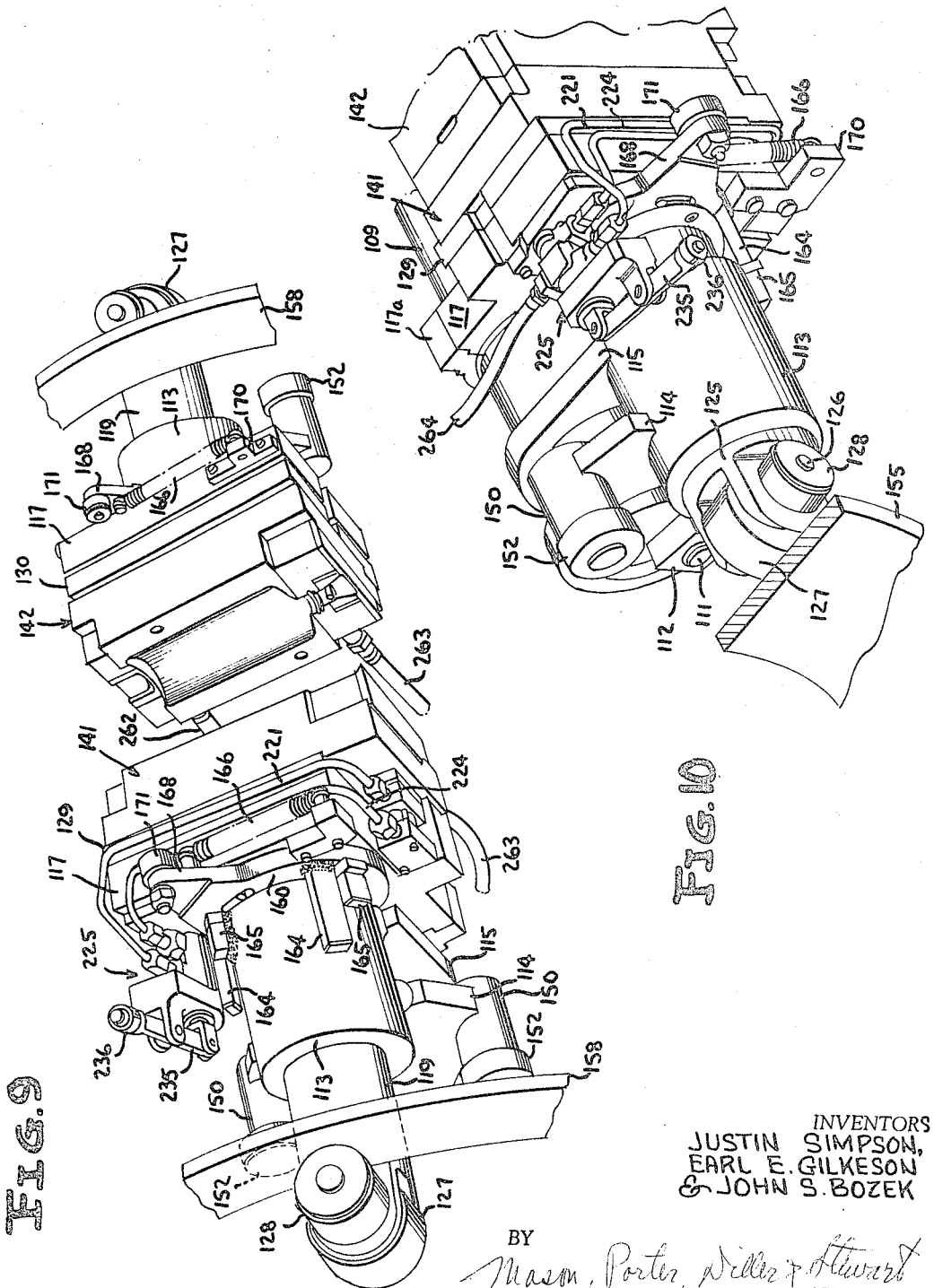

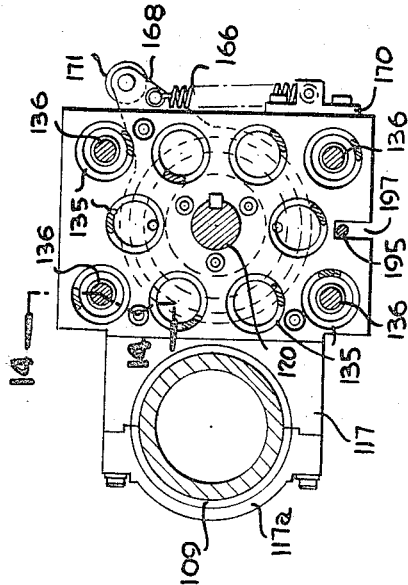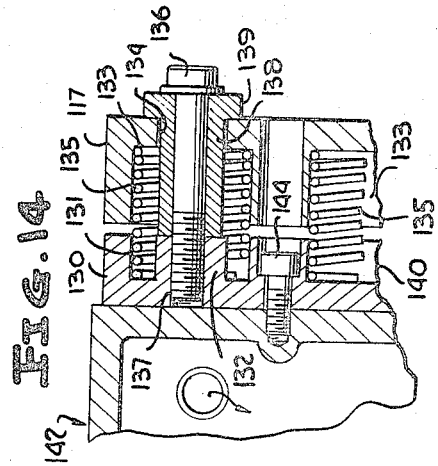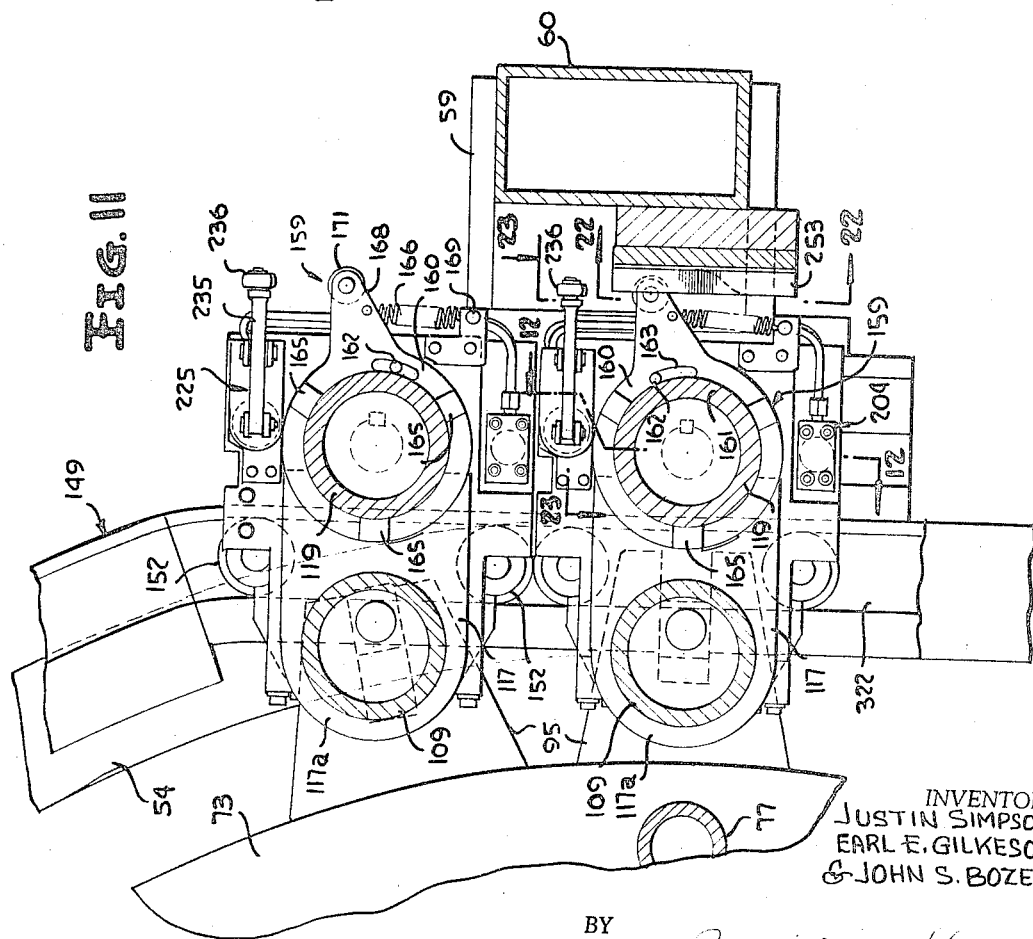

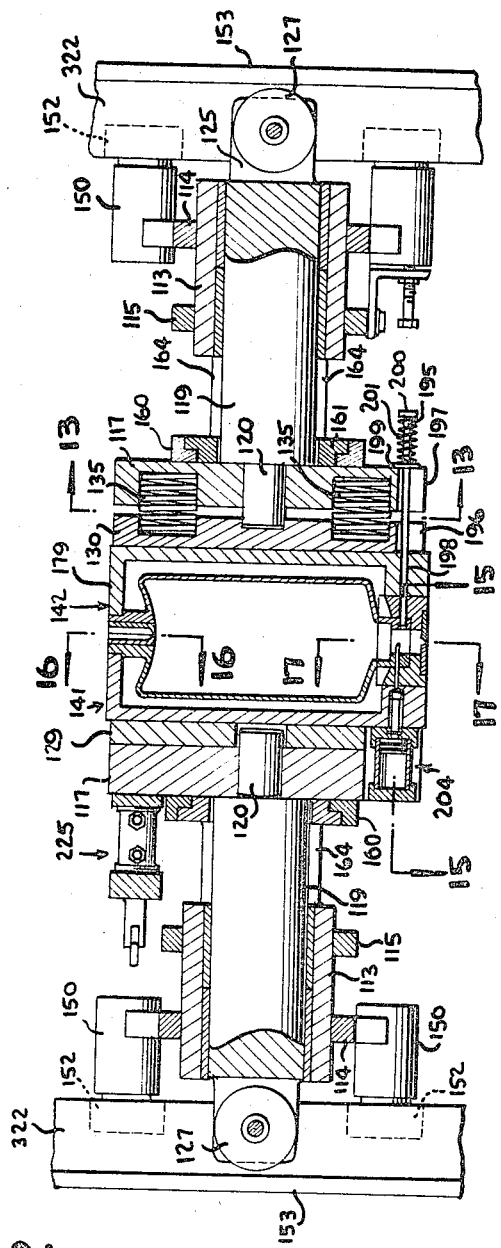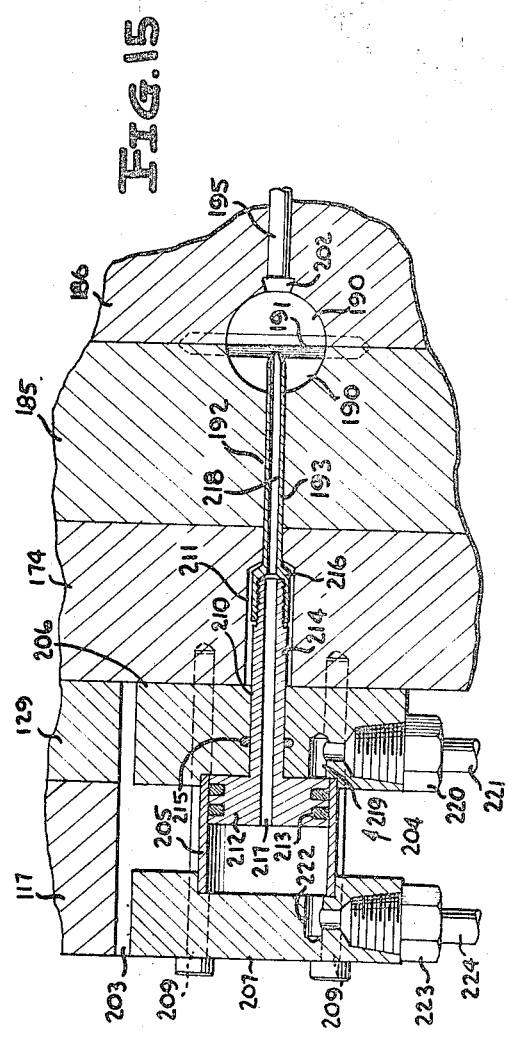

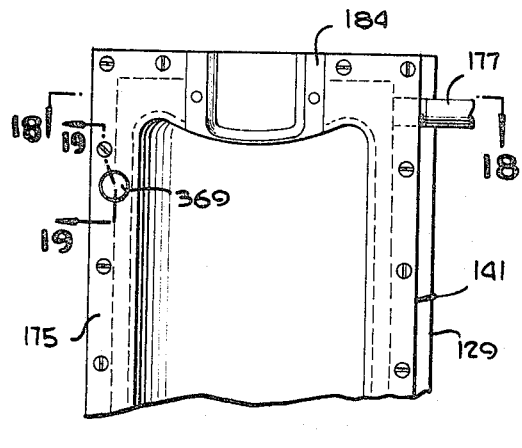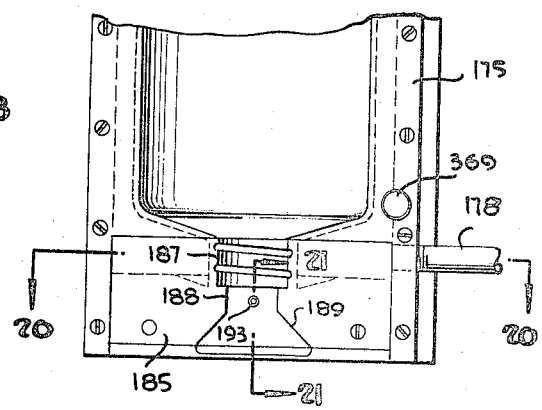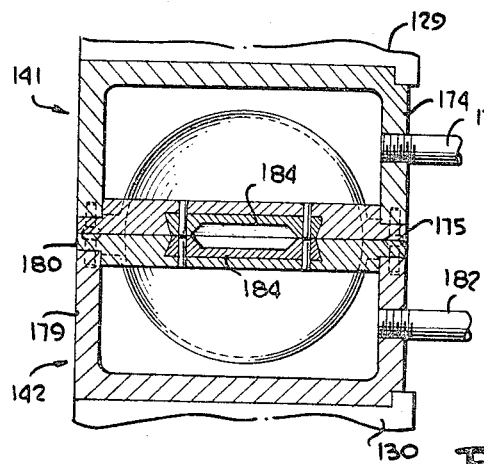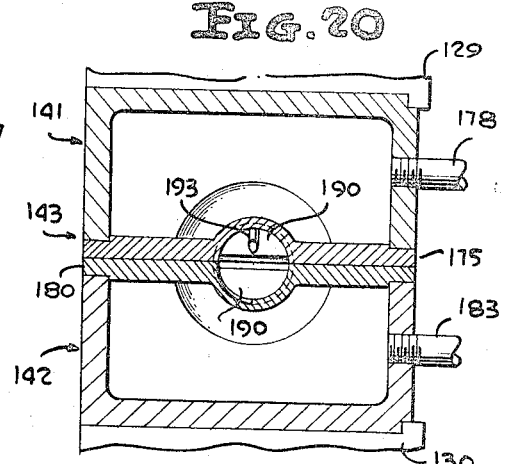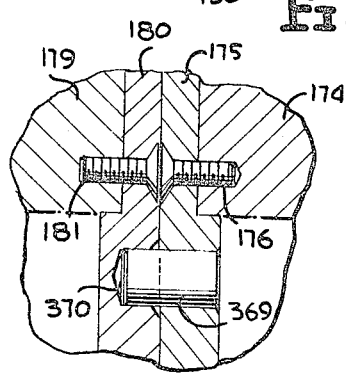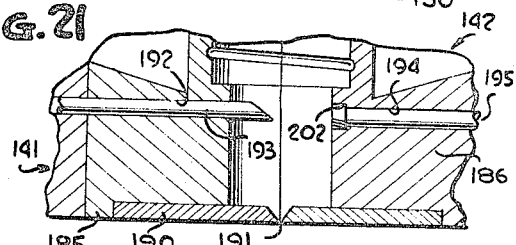

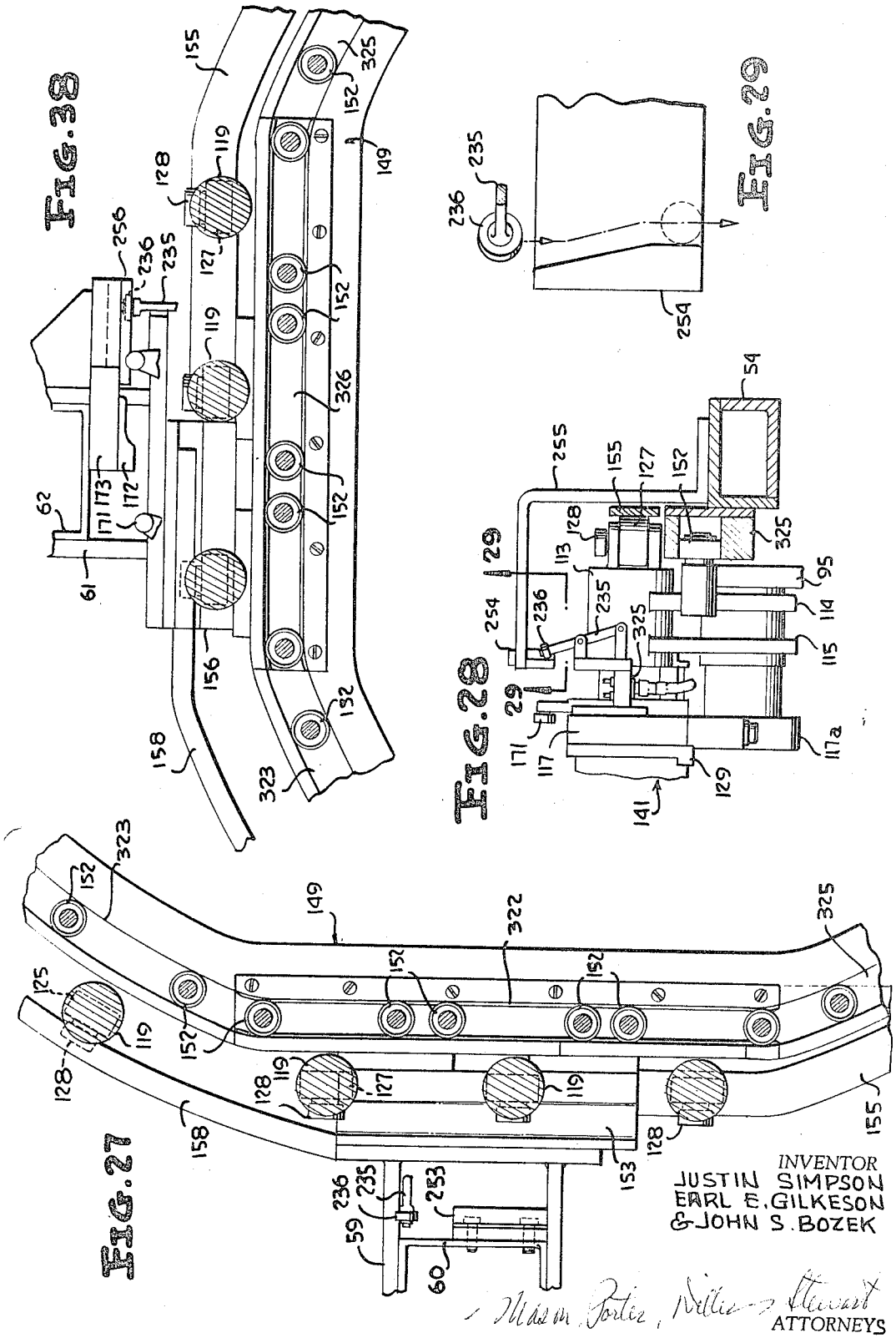

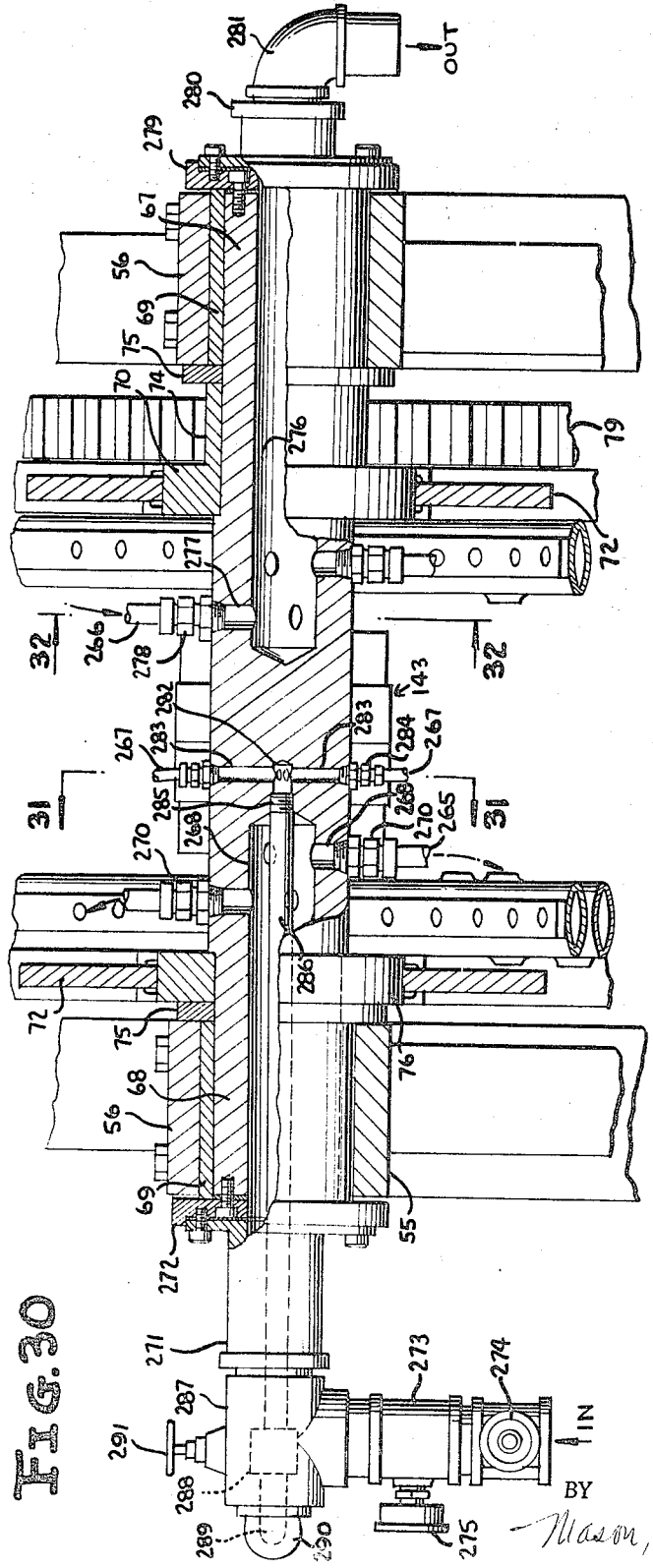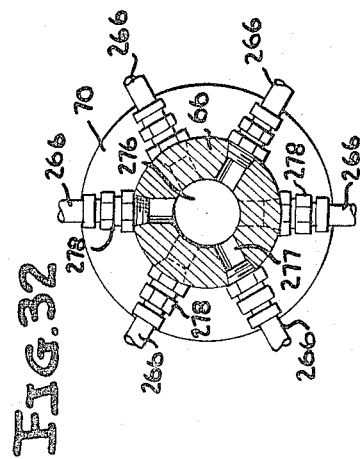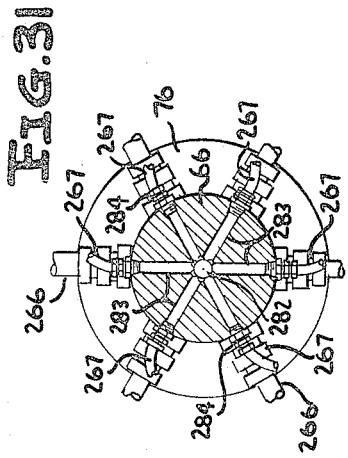

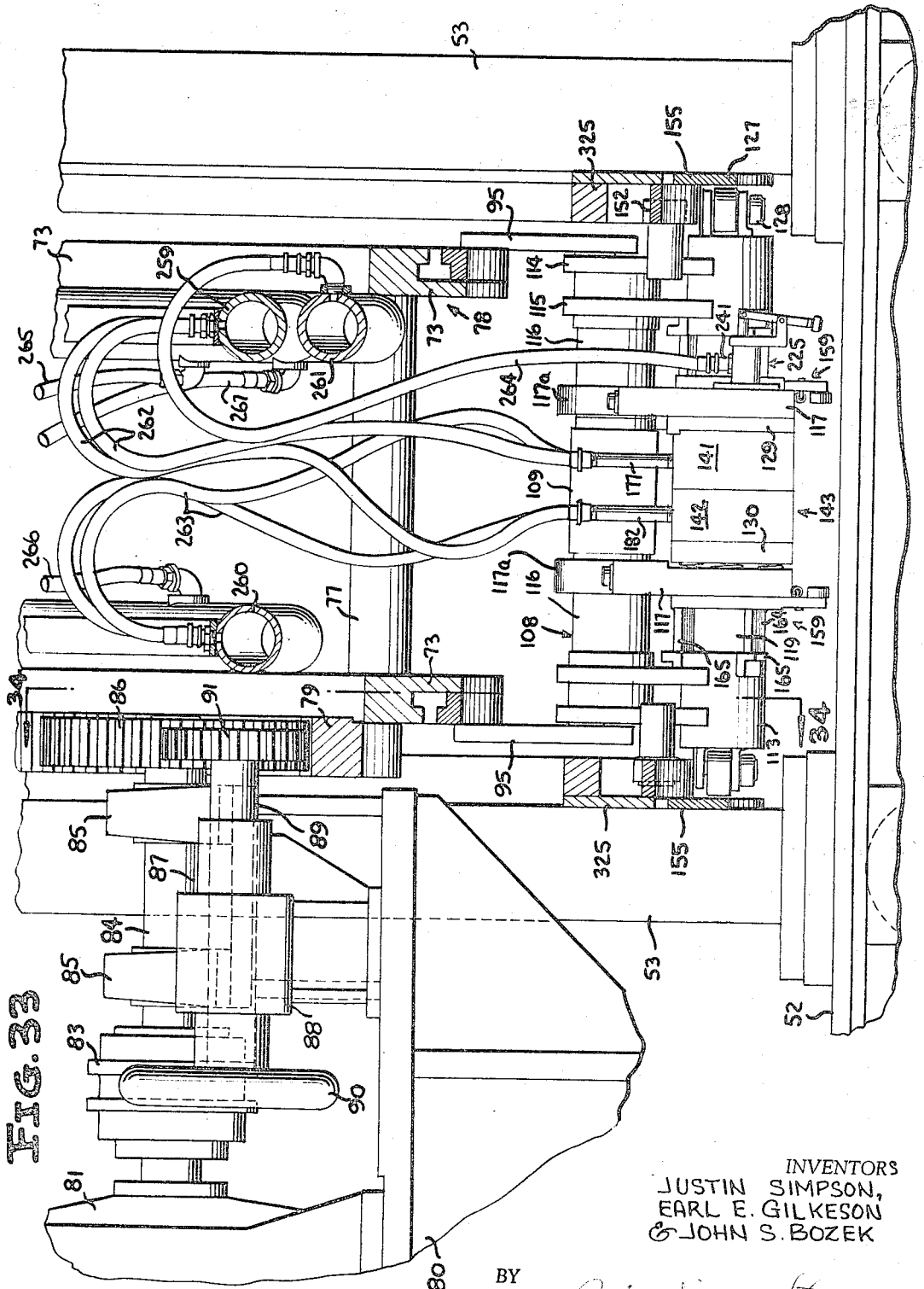

March 28, 1967 J. SIMPSON ET AL 3,310,834
PLASTIC BOTTLE MOLDING MACHINE
Filed Oct. 30, 1963 21 Sheets-Sheet 16

INVENTORS
JUSTIN SIMPSON
EARL E. GILKESON
& JOHN S. BOZEK
BY
ATTORNEYS

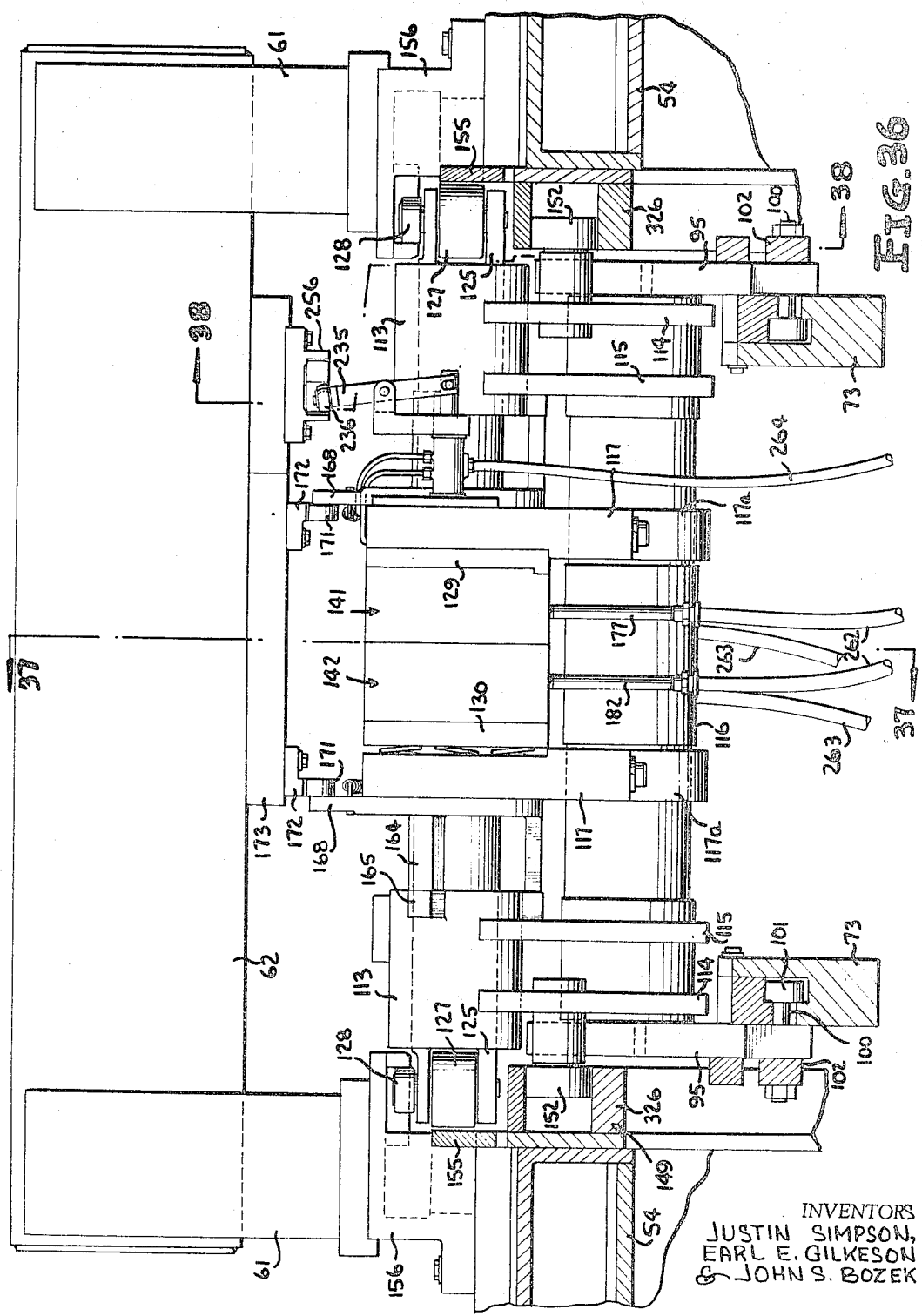

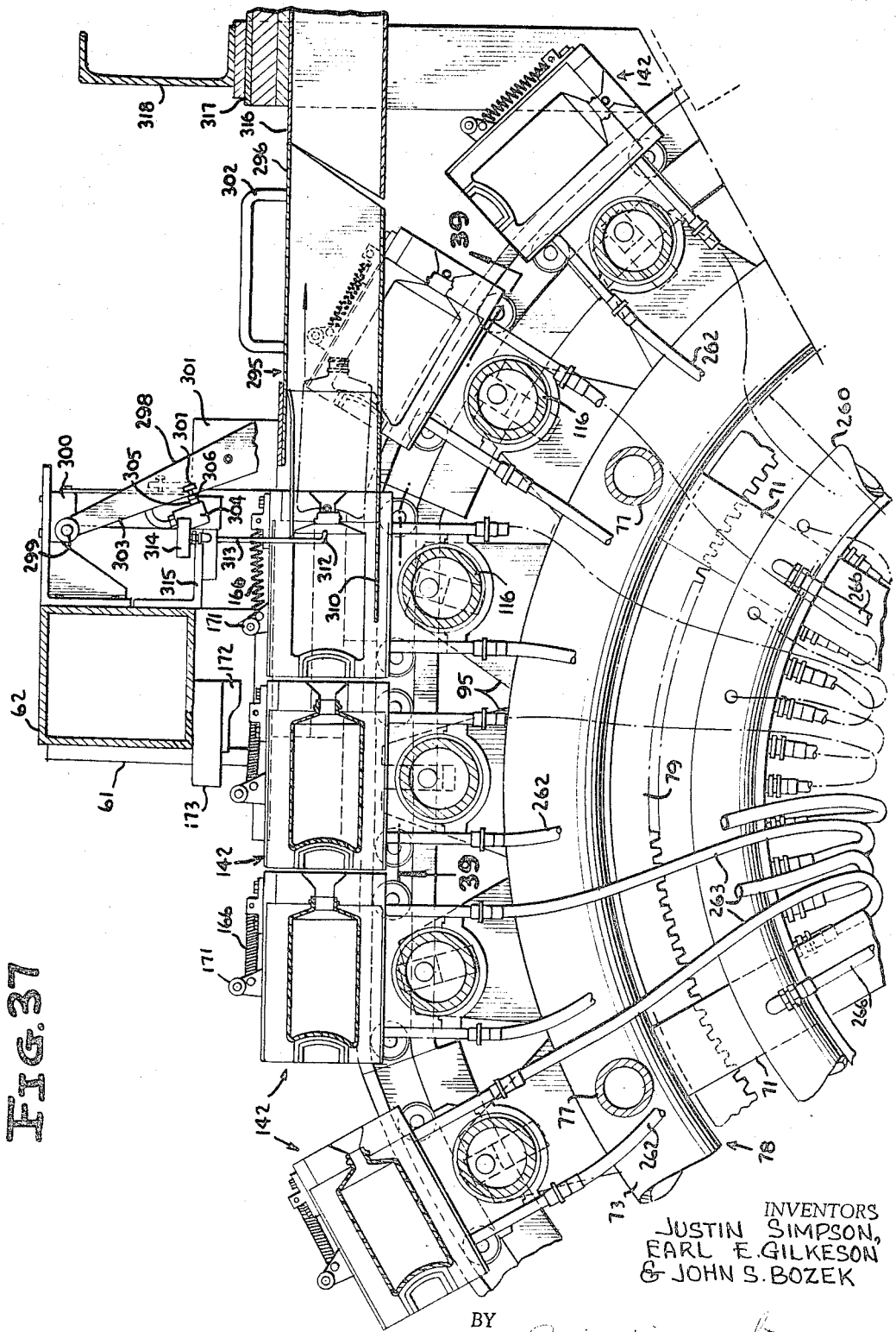

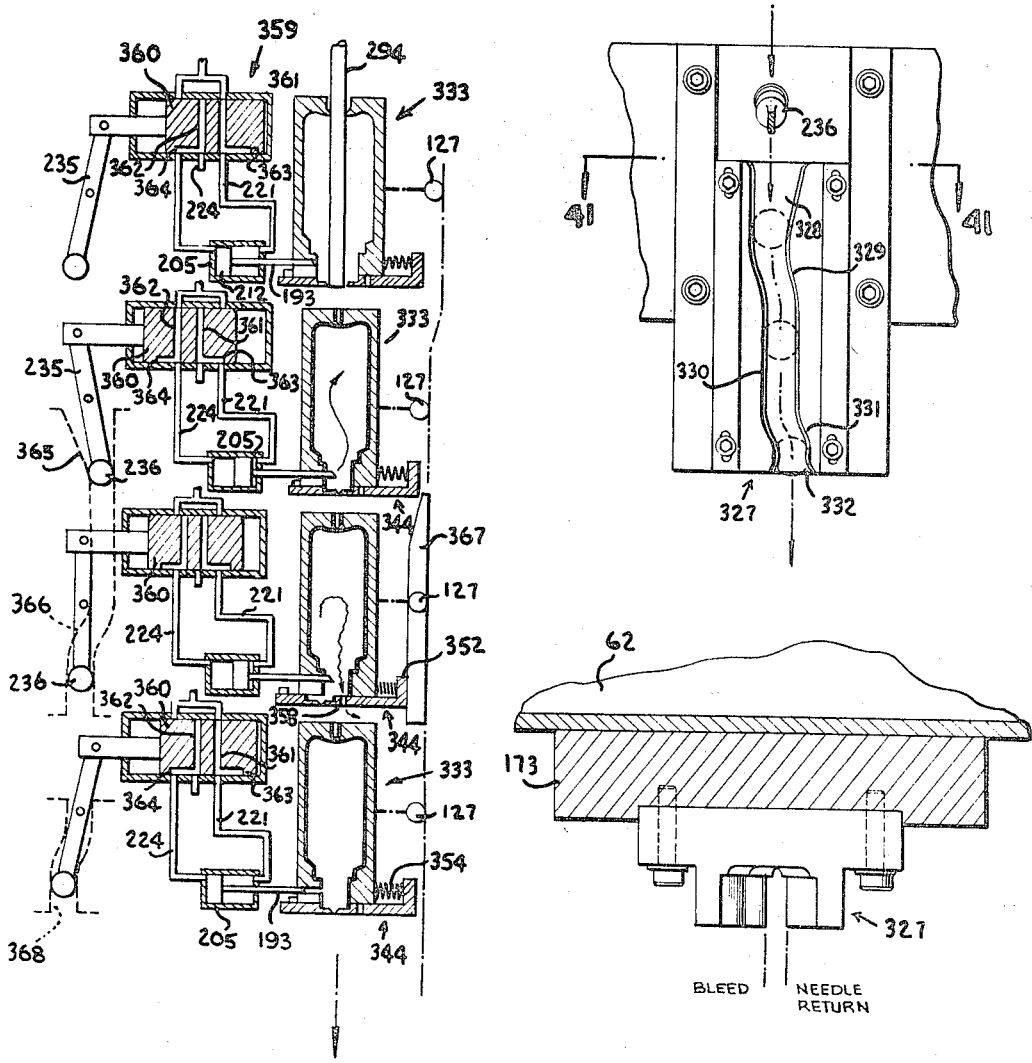

March 28, 1967 J. SIMPSON ET AL 3,310,834
PLASTIC BOTTLE MOLDING MACHINE
Filed Oct. 30, 1963 21 Sheets-Sheet 21
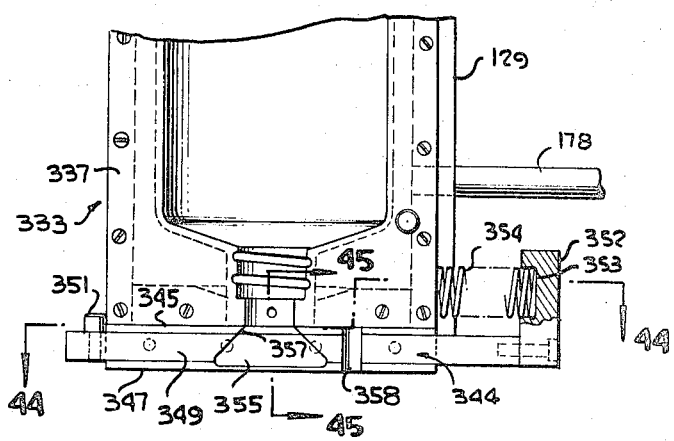
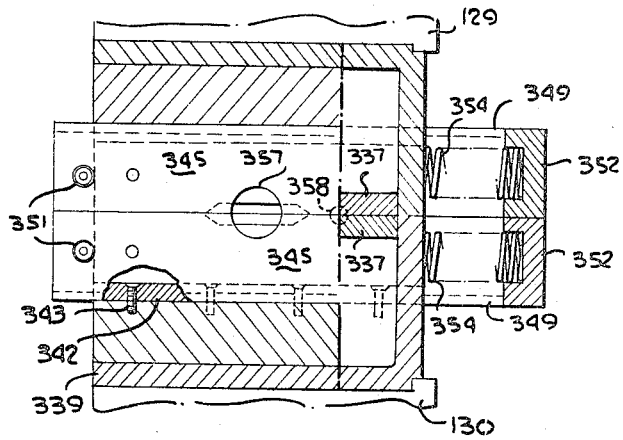
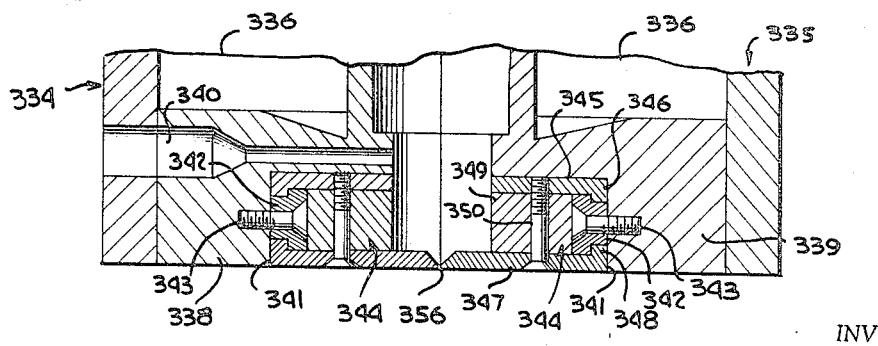
INVENTORS
JUSTIN SIMPSON
EARL E. GILKESON
& JOHN S. BOZEK
BY
Mason, Porter, Diller & Stewart
ATTORNEYS

United States Patent Office 3,310,834
Patented Mar. 28, 1967

3,310,834
PLASTIC BOTTLE MOLDING MACHINE
Justin Simpson, Elmhurst, Ill., Earl E. Gilkeson, Rocky River, Ohio, and John S. Bozek, Chicago, Ill., assignors to Continental Can Company, Inc., New York, N.Y., a corporation of New York
Filed Oct. 30, 1963, Ser. No. 320,192
49 Claims. (Cl. 18—5)

This invention relates in general to novel improvements in plastic molding equipment, and more particularly to a novel blow molding machine for blowing hollow articles from a continuously extruded plastic tube.

This invention particularly relates to plastic molding machines wherein a plastic tube is continuously extruded from an extrusion die, and the tube is sequentially engaged by molds which clamp off sections of the tube and sections extending between adjacent molds. The clamped off sections of the tube are sealed by the clamping action of the molds and air is introduced into the sealed off sections for the purpose of blowing the sealed off sections of the tube to conform to the configuration of the molds. A major deficiency of existing molding machines is that there is a large quantity of the extruded tube between the adjacent molds as compared to the actual amount of the tube which is used in the forming of the blown articles. While this material of the tube is not wasted, it must be collected and re-ground at an undesirable expense. Further, it has been found that the re-grinding and re-working of the plastic within an extruder produces degradation of the plastic which is undesirable in conjunction with certain products which may be placed within plastic containers.

In view of the foregoing, it is the primary object of this invention to provide a molding machine which has a plurality of molds for receiving sections of a continuously extruded tube wherein material betwen adjacent molds is eliminated so as to minimize that portion of an extruded tube which must be reused.

Another object of this invention is to provide a molding machine which has a plurality of molds for receiving sections of a continuously extruded tube wherein at the time the extruded tube is received within the molds, the molds are brought into a closer-than-normal relationship with one another thereby eliminating the section of the tube between adjacent molds.

Another object of this invention is to provide a molding machine of the type wherein a tube is continuously extruded and the tube moves in a substantially straight line, the molding machine being of a rotary type and including a plurality of molds particularly adapted to clamp and seal off sections of the extruded tube, the molds being mounted for movement from a circular pattern to a straight line pattern at the time the tube is received by the molds so that the tube may be simultaneously received within more than one mold despite the fact that the tube is moving in a straight line path and the molds are moving normally in a generally circular path.

Another deficiency of existing molding machines is that the normal molding machine is constructed to form one size of article only with the result that the normal molding machine is very restricted in its diversification as far as variations in articles are concerned. In order that a molding process may be more expeditiously performed and the cost of molding an article may be reduced, it has been necessary to build machines having a large number of molds, and which operate at relatively high speeds. However, because of the rigid restrictions as to the articles which can be formed with such machines, there are many instances where a high output low production cost machine cannot be utilized due to the fact that the demand for a sufficient number of the particular size of article which can be made by the particular machine was not sufficiently great.

Accordingly, it is another object of this invention to provide a novel blow molding machine which is of a construction wherein not only are the molds interchangeable for the purpose of molding different articles of the same size, but also, the supports for the molds are interchangeable whereby the machine may be converted, as desired, for forming a large number of small articles per unit of time or a smaller number of large articles per the same unit of time.

Another object of this invention is to provide a novel blow molding machine which includes two frame members mounted for rotation about an axis and wherein the frame members are provided with an equal number of transversely aligned brackets which have removably received therein means carried by the frame member whereby brackets of different sizes may be mounted on the frame member to provide for the supporting of a varied number of mold supports in accordance with the molding requirements of the particular articles to be molded on the machine.

Still another object of this invention is to provide a novel blow molding machine of the constantly rotating type wherein each mold is mounted for both swinging and sliding movement relative to the frame members of the molding machine whereby the molds for the most portion of a cycle of travel are evenly circumferentially spaced and passed along a circular path, but wherein when the molds approach an extruded tube to be received by the molds, the molds simultaneously swing towards one another and move relative to the frame of the molding machine so as to be both in a straight line and in closely spaced relation as compared to the normal spacing of the molds.

Another object of this invention is to provide a novel molding machine which includes spaced frame members mounted for rotation about an axis, the frame members being provided with aligned pairs of sockets or recesses in which there are seated for sliding movement mounting blocks which, in turn, support a plurality of support shafts extending generally transversely between the frame members, each support shaft supporting a pair of mold halves mounted for movement relative to the support shaft between open and closed positions, and there being associated with the support shaft guide means for effecting the relative sliding movement of the support shafts relative to the frame members whereby the path of travel of the molds may be varied from the conventional circular path of molds to facilitate the loading and unloading of the molds, as may be desired.

A further object of this invention is to provide a novel mold unit which includes a pair of brackets interchangeably carried by a pair of spaced frame members mounted for rotation, a support shaft extending generally between the brackets and having eccentrically mounted blocks slidably seated in the brackets and being rotatable relative to the support shaft whereby the support shaft may be simultaneously slid and rocked relative to the brackets, the support shaft being provided with a pair of mold half mounting plates which are slidable thereon, the support shaft also being provided with sleeves adjacent the ends thereof receiving control shafts which are connected to the mounting plates for effecting the opening and closing of mold halves carried thereby, there being carried by the ends of the control shafts cam followers whereby the control shafts may be positioned by means of cams to effect the opening and closing of the mold halves, and there being carried by the sleeves guide track followers for effecting the sliding and rocking of the support shaft relative to the brackets.

Another object of this invention is to provide a novel mold assembly in accordance with the foregoing object wherein lock means are provided between the mounting plates and the sleeves for retaining the mounting plates in a mold closing position.

Still another object of this invention is to provide a novel mold unit in accordance with the foregoing wherein one of the mounting plates is of a two-piece construction and the two pieces are resiliently urged apart whereby the closing of a mold under a predetermined pressure is assured, while the possibility of jamming the mold opening and closing mechanism is prevented.

Another object of this invention is to provide in a rotary molding machine, means for effecting the removal of molded articles from a mold, the means including a discharge chute disposed within the normal path of closed molds and having open mold halves passing along opposite sides thereof, the discharge chute having associated therewith means for forcing released articles thereinto whereby articles removed from the molds are immediately received at a conveniently located position and are transferred from the molding machine.

Still another object of this invention is to provide in a molding machine a discharge chute in accordance with the foregoing object wherein the discharge chute is pivotally mounted for swinging to an out-of-the-way position in the event of the initiating of a jam between the discharge chute and molded article and the remainder of the molding machine, and wherein there is associated with the movable section of the discharge chute a switch for controlling the operation of the molding machine so as to automatically discontinue the operation of the molding machine in the event there is a jam of a nature which would cause swinging of the discharge chute.

Another object of this invention is to provide in a molding machine of the type having molded article discharge means as set forth in the foregoing objects, an air blast for directing air between open mold halves against a molded object to force the molded object into and through the discharge chute.

Still another object of this invention is to provide in a novel blow molding machine of the type set forth above having a discharge chute, means for effecting the movement of the molds of the machine to a generally straight line path at the time of discharge whereby clearance for the discharge chute may be effected and the straight line movement of an article being discharged into the discharge chute may be accomplished.

A further object of this invention is to provide in a blow molding machine a blowing apparatus which includes a projectable blow needle which has associated therewith a control valve, the blow needle being actuated by a fluid cylinder which includes a piston having a fluid passage therethrough aligned with the bore of the needle and the valve mechanism being of a nature whereby the blow needle may be selectively projected and fluid passed therethrough under pressure, the needle retracted, or fluid continuously fed into the blown article.

The cooling cycle of a blow molding machine is a factor which controls the rate of operation of blow molding machines. The newly extruded plastic tube which is engaged by the molds of a blow molding machine is at a temperature whereat it can be blown by the introduction of fluid under pressure. However, the blown plastic material must set before it is removed from the molds. While a cooling fluid may be circulated around the molds, and for the most part the molded articles cooled, certain end portions of the articles are more difficult to cool due to the fact that they are thicker than other portions of the articles and have attached thereto waste portions of the tube which are clamped within the molds to effect the sealing of the tube. In accordance with this invention, it is also an object to provide means for removing from a partially set article the excess material of the tube at the end of the article adjacent to which the blow needle is passed into the article whereby the heat content of the removed portion of the tube no longer presents a cooling problem, and fluid may be readily circulated through the article to effect the cooling thereof with the fluid venting out through the end of the article which is open due to the removal of the portion of the tube.

With the above and other objects in view that will hereinafter appear, the nature of the invention will be more clearly understood by reference to the following detailed description, the appended claims and the several views illustrated in the accompanying drawings.

In the drawings:

FIGURE 1 is a side elevational view of the blow molding machine of this invention and shows the general details of construction thereof.

FIGURE 2 is a plan view of the molding machine of FIGURE 1 and shows further details thereof.

FIGURE 3 is a diagrammatic view showing the cycle of operation of the molding machine.

FIGURE 4 is a diagrammatic view showing specific details of the molds and the relationship thereof during a complete cycle of operation of the molding machine.

FIGURE 5 is a fragmentary generally horizontal sectional view on a large scale taken generally along the line 5—5 of FIGURE 1 and shows generally the specific details of one mold unit and the relationship thereof to the remainder of the molding machine, the view being taken through the extruded tube.

FIGURE 6 is an enlarged fragmentary vertical sectional view taken generally along the line 6—6 of FIGURE 5 and shows the specific relationship of the extrusion die of the plastic extruder, the tube extruded from the extrusion die, and molds of the molding machine at the time the tube is being received within the molds and during the blowing operation on the clamped portion of the tube.

FIGURE 7 is an enlarged fragmentary transverse vertical sectional view taken substantially along the line 7—7 of FIGURE 6 and shows the specific relationship of the molds disposed along the straight line portion of the travel of the molds during the reception and blowing of the tube, the view also showing specific details of the means for guiding the molds and effecting the closing thereof.

FIGURE 8 is an enlarged fragmentary generally horizontal sectional view taken substantially along the line 8—8 of FIGURE 6 and shows more specifically the details of one of the mold units.

FIGURE 9 is a fragmentary perspective view showing a portion of one of the mold units in its open position, and shows further the details of the mold unit.

FIGURE 10 is a fragmentary perspective view similar to FIGURE 9, but with the mold unit rotated to a position wherein the mold of the mold unit is closed through the engagement of a cam follower of the mold unit with a fixed mold closing cam.

FIGURE 11 is an enlarged fragmentary longitudinal vertical sectional view taken generally along the line 11—11 of FIGURE 7 and shows the specific details of the lock mechanism for locking the mold in a closed position.

FIGURE 12 is an enlarged fragmentary transverse vertical sectional view taken generally along the line 12—12 of FIGURE 11 and shows more specifically the details of construction of one of the mold units, including the specific details of the mounting and construction of the mold halves.

FIGURE 13 is an enlarged fragmentary longitudinal vertical sectional view taken generally along the line 13—13 of FIGURE 12 and shows the specific resilient mounting of one of the plate elements of a mounting plate for a mold half.

FIGURE 14 is an enlarged fragmentary generally vertical sectional view taken along the line 14—14 of FIGURE 13 and shows more specifically the resilient separation of the two plate elements of the divided, spring urged mounting plate for the mold half.

FIGURE 15 is an enlarged fragmentary generally horizontal sectional view taken along the line 15—15 of FIGURE 12 and shows specifically the details of a blow needle carried by one of the mold halves and the fluid motor for effecting the projection and retraction of the blow needle.

FIGURE 16 is a fragmentary enlarged vertical sectional view taken through the upper part of a mold generally along the line 16—16 of FIGURE 12, and shows the details of construction of the upper portion of a mold half.

FIGURE 17 is an enlarged fragmentary vertical sectional view similar to FIGURE 16 and taken along the line 17—17 of FIGURE 12 and shows the general construction of the lower portion of the mold half of FIGURE 16.

FIGURE 18 is a horizontal sectional view taken substantially along the line 18—18 of FIGURE 16 and shows the internal construction of the upper portions of the two mold halves including means for effecting the sealing of one end of a clamped section of a tube received within the mold.

FIGURE 19 is an enlarged fragmentary generally vertical sectional view taken substantially along the line 19—19 of FIGURE 16 and shows the manner in which the sections of the mold halves are secured together and the means for assuring alignment of two mold halves when they are brought into a closed mold forming position.

FIGURE 20 is an enlarged fragmentary horizontal sectional view taken generally along the line 20—20 of FIGURE 17 through the lower portion of the closed mold halves and shows further the details of construction of the mold halves.

FIGURE 21 is an enlarged fragmentary vertical sectional view taken substantially along the line 21—21 of FIGURE 17 and shows the details at the lower part of the mold including the relationship of the blow needle and a molded article ejector carried by the two mold halves.

FIGURE 22 is a fragmentary transverse vertical sectional view taken along the line 22—22 of FIGURE 11 and showing in elevation the details of a cam unit for effecting the operation of the control valve for the blow needle of each mold.

FIGURE 23 is an enlarged fragmentary generally horizontal sectional view taken substantially along the line 23—23 of FIGURE 11 and shows specifically the construction of the control valve and the means for effecting the actuation of the same.

FIGURE 24 is a diagrammatic view showing the blow system for a mold with the control valve thereof in a position for retaining the blow needle in a retracted position.

FIGURE 25 is a diagrammatic view similar to FIGURE 24 showing the control valve shifted to a blow needle projecting position, and the blow needle having been projected and an article blow molded within the associated mold.

FIGURE 26 is a diagrammatic view similar to FIGURE 24 and shows the control valve shifted to a position for effecting the venting of fluid from within the blown article back through the blow needle whereby the pressure within the blown article may be relieved.

FIGURE 27 is an enlarged fragmentary longitudinal vertical sectional view taken generally along the line 27—27 of FIGURE 7 and shows the specific details of the guide track for effecting the guiding of the molds both along the straight portion of the path of movement of the molds during which the tube is received, and along arcuate portions of the path of travel, there also being shown the details of the cam tracks for effecting both the opening and closing of the molds.

FIGURE 28 is an enlarged fragmentary sectional view taken along the line 28—28 of FIGURE 1 and shows the details of a cam member for effecting the shifting of the control valve for the blow unit of each mold at the desired vent station in the travel.

FIGURE 29 is a schematic view taken generally along the line 29—29 of FIGURE 28 and shows the relationship of the control valve actuator with respect to the cam of FIGURE 28.

FIGURE 30 is an enlarged fragmentary vertical sectional view taken substantially along the line 30—30 of FIGURE 1 and shows the specific details of the main shaft of the machine and the various passages therein for supplying air and coolant to the molds and receiving coolant from the molds.

FIGURE 31 is an enlarged fragmentary sectional view taken transversely of the shaft along the line 31—31 of FIGURE 30 and shows generally the air line connections for the various molds.

FIGURE 32 is a vertical sectional view similar to FIGURE 31 and taken generally along the line 32—32 of FIGURE 30 and shows the details of the coolant return connections with the shaft.

FIGURE 33 is an enlarged fragmentary generally vertical transverse sectional view taken along the line 33—33 of FIGURE 1 and shows the manner in which the machine is driven, the view also showing the general manifold arrangement for air and coolant.

Figures 34, 35:
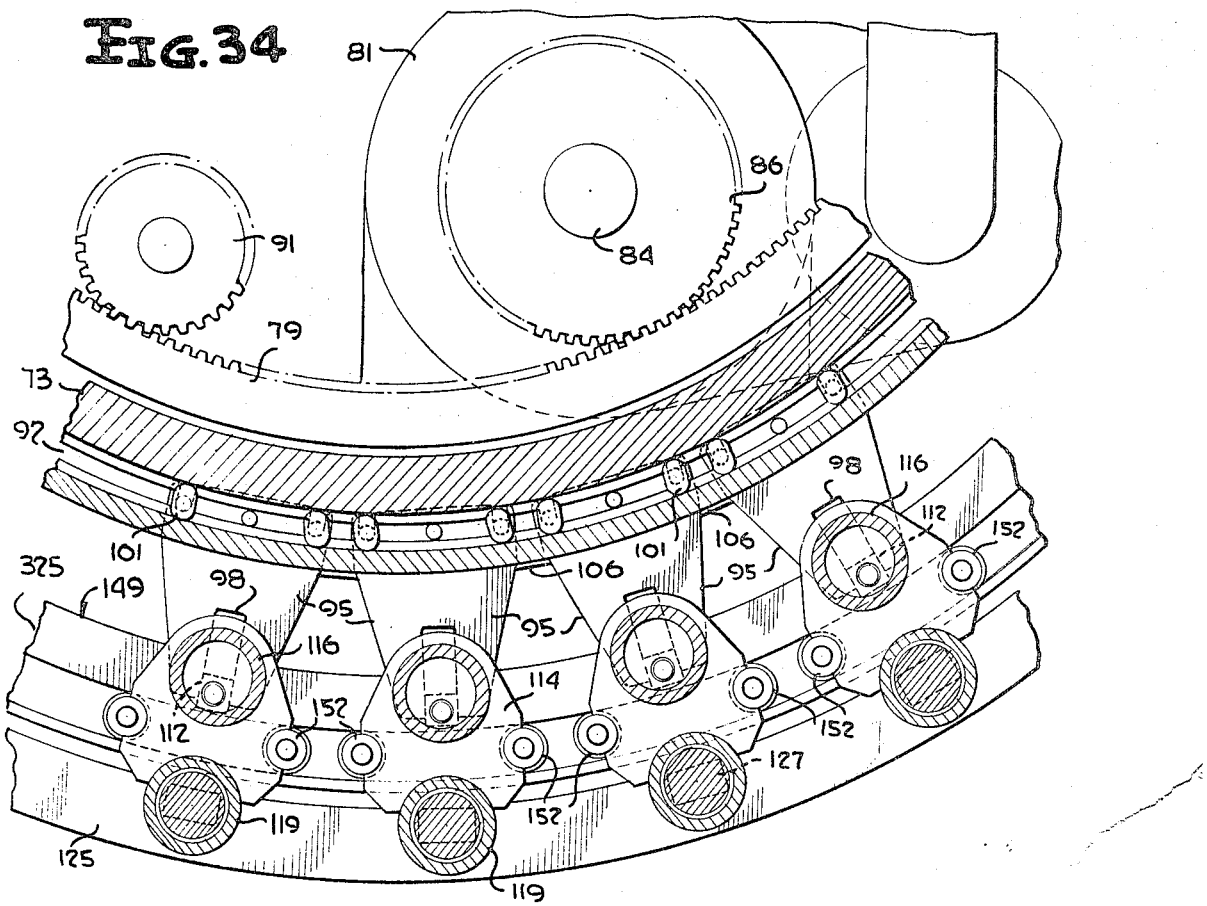

FIGURE 34 is an enlarged fragmentary longitudinal vertical sectional view taken through the lower portion of the machine generally along the line 34—34 of FIGURE 33 and shows the specific drive mechanism of the machine as well as the specific mounting of the mold units on the frame members of the machine.

FIGURE 35 is an enlarged fragmentary exploded perspective view showing further the details of the mounting of the mold units on a frame member, the view showing the details of the interchangeable mounting brackets for the mold units on the frame members.

FIGURE 36 is an enlarged fragmentary generally vertical sectional view taken substantially along the line 36—36 of FIGURE 1 and shows generally the details of a mold unit as it appears in the upper part of the machine preparatory to the opening thereof to release the article blown therein.

FIGURE 37 is an enlarged fragmentary longitudinal vertical sectional view taken through the upper part of the machine generally along the line 37—37 of FIGURE 36 and shows the details of the means for removing molded articles from the molds.

FIGURE 38 is a fragmentary generally vertical sectional view taken along the line 38—38 of FIGURE 36 and shows the details of the guide track and the cam tracks for effecting the control of the positioning and opening and closing of the molds in the discharge area of the machine.

Figure 39:
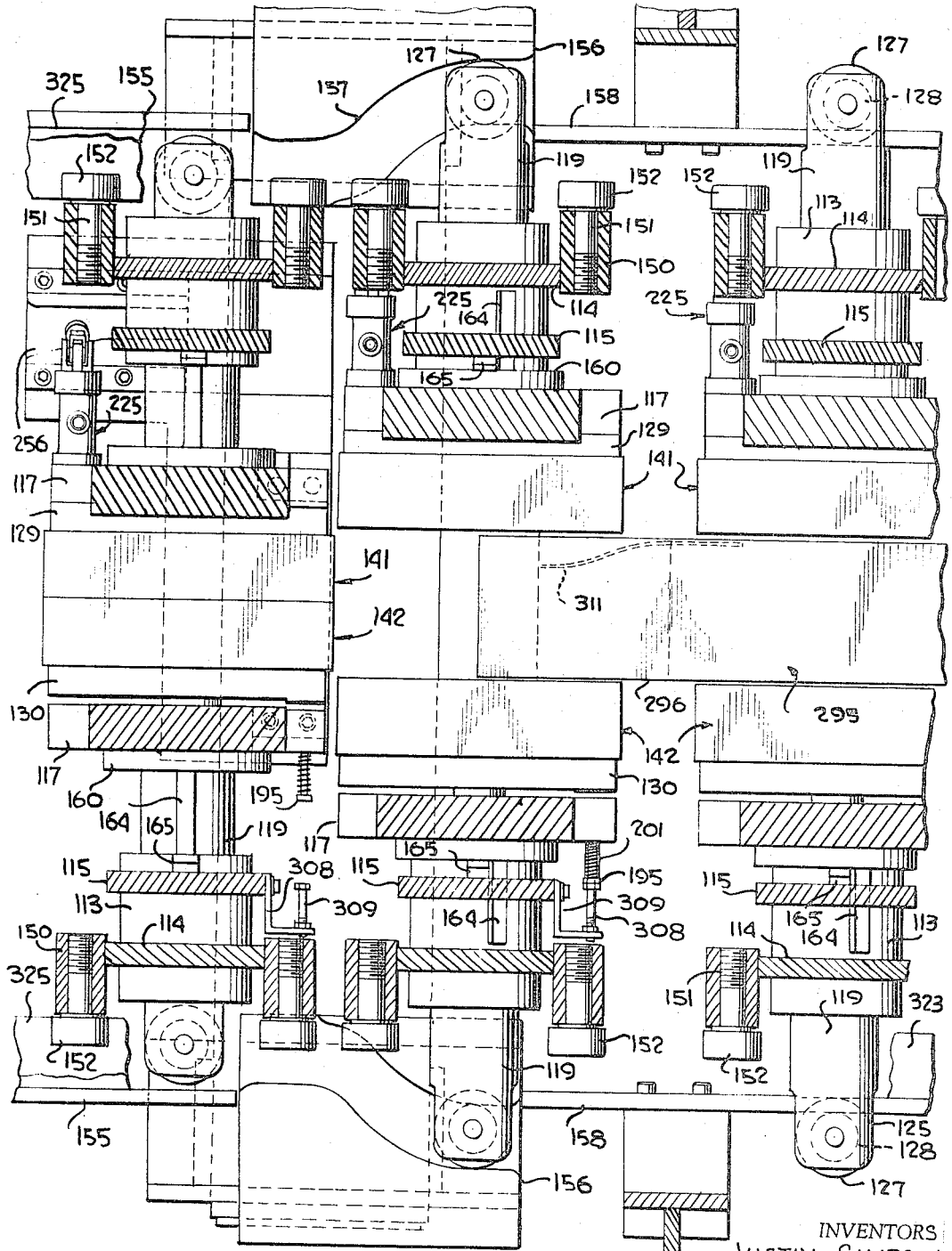

FIGURE 39 is an enlarged fragmentary generally horizontal sectional view taken along the line 39—39 of FIGURE 37 and shows more specifically the relationship of the molds with respect to the discharge chute during the discharging of an article from one of the molds.

FIGURE 40 is a fragmentary elevational view of a modified form of control valve operating cam for the purpose of first effecting the venting of a molded article for a short period of time and then shifting the control valve to its blow needle retracting position.

FIGURE 41 is a fragmentary horizontal sectional view taken generally along the line 41—41 of FIGURE 40 and shows further details of the cam of FIGURE 40.

FIGURE 42 is a diagrammatic view showing steps in the sequence of the blowing of an article, the venting of the article and the removal of the blow needle from the blown and vented article.

FIGURE 43 is an enlarged fragmentary elevational view looking at one face of a mold half, showing the general details of means for breaking off the clamped and sealed portion of the tube after an article has been blown from the tube and has partially set to facilitate the venting and, therefore, cooling of the article, the view being similar to FIGURE 17.

FIGURE 44 is a fragmentary horizontal sectional view taken generally along the line 44—44 of FIGURE 43 and shows further the details of the means for removing the clamped portion of the tube.

FIGURE 45 is an enlarged fragmentary vertical sectional view taken generally along the line 45—45 of FIGURE 43 and shows more specifically the details of the means for effecting the clamping and sealing of one end of a tube section and for effecting the removal of the clamped portion of the tube section.

Referring now to the drawings in detail, it will be seen that the over-all blow molding machine of this invention is generally shown in FIGURES 1 and 2, and is generally referred to by the numeral 50. The blow molding machine includes a frame, generally referred to by the numeral 51. The frame 51 includes a suitable, generally rectangular base 52 from which a pair of spaced, composite frame units extend upwardly, each frame unit being disposed adjacent an edge of the base 52. Each frame unit includes a pair of standards 53 which terminate at their upper ends in an integral arcuate frame member 54 so that the standards 53 and the frame member 54 form an inverted U-shaped frame member. A bearing block 55 is disposed generally at the center of curvature of the frame member 54 and is provided with a removable bearing cap 56. The bearing block 55 is supported by a pair of diagonal frame members 57 which extend upwardly from the base 52 adjacent the connections of the standards 53 with the base 52. The bearing block 55 is also supported by a pair of horizontal frame members 58 which extend from the upper ends of the standards 53 and a central standard 58a extending up from the base 52.

In order that the upper portions of the frame units may be rigidly connected together, the frame member 54 is provided at its connection with the standards 53 with suitable brackets 59. Transversely extending beams 60 extend between the brackets 59 of the two frame units and rigidly connect the same together. Also, the upper part of each frame member 54 is provided with a bracket 61 and an upper beam 62 extends transversely over the remainder of the frame 51 and is suitably secured to the brackets 61.

In order to facilitate the levelling of the frame 51, the base 52 is provided along two sides thereof with suitable brackets 63 in which levelling screws 64 are mounted for vertical movement and held against rotation. The intermediate part of each levelling screw 64 has engaged therewith a nut 65 which, when turned, raises or lowers the associated levelling screw 64 relative to the base 52 so as to effectively raise or lower the blow molding machine 50.

Reference is now made to FIGURE 30 wherein it is shown that the machine 50 includes a main shaft 66 which has end portions 67 and 68 rotatably journalled in bearing sleeves 69 carried by the bearing blocks 55 and their respective bearing caps 56. The end portion 67 has suitably secured thereto within the confines of the frame 51 a hub 70 from which a plurality of spokes 71 extend radially outwardly. The inner portions of the spokes 71 are reinforced by a generally circular gusset 72. The spokes 71, as is shown in FIGURE 37, carry at their outer ends a circular frame member 73 which will be described in detail hereinafter. The hub 70 has an extension 74 which spaces the same from the bearing block 55 and a thrust washer 75 is disposed between the bearing block 55 and its bearing cap 56 on one hand, and the hub extension 74 on the other hand.

The shaft end portion 68, which is shorter than the shaft end portion 67, has suitably secured thereon a hub 76 for rotation therewith. The hub 76, like the hub 70, has a plurality of spokes 71 extending therefrom with the connections between the spokes 71 and the hub 76 being reinforced by an arcuate gusset 72. The outer ends of the spokes 71 support a second circular frame member 73. The frame members 73 are connected together at circumferentially spaced intervals by transversely extending rods 77. At this time it is pointed out that another thrust washer 75 is disposed between the hub 76 on one hand, and the associated bearing block 55 and bearing cap 56 on the other hand.

For identification purposes, the hubs 70 and 76, the spokes 71, the circular frame members 73 and all other elements carried thereby will be hereinafter referred to as a paddle wheel, which is generally referred to by the numeral 78. The paddle wheel 78 is driven by means of an internal gear 79 which is secured to the spokes 71 carried by the hub 70, the gear 79 being suitably secured to the spokes 71 on the outer surfaces thereof.

Referring now to FIGURES 2, 33 and 34, it will be seen that the base 52 has a mounting stand 80 suitably secured thereto and projecting to one side thereof. The mounting stand 80 has a variable speed drive unit 81 mounted thereon, and the drive unit 81 has an output shaft 82 which is coupled by means of a coupling 83 to a drive shaft 84. The drive shaft 84 is suitably journalled in a pair of bearing assemblies 85 and is provided with a drive gear 86 on the end thereof remote from the coupling 83, which drive gear 86 is meshed with the gear 79.

At times it is desirable to move the paddle wheel 78 only short distances which cannot be readily accomplished by the drive unit 81. Accordingly, there is provided a jogging mechanism, generally referred to by the numeral 87. This jogging mechanism includes a suitable frame 88 which carries a shaft 89 that is rotatable by means of a hand wheel 90. The shaft 89 carries a drive gear 91 which is meshed with the gear 79 for driving the same. At this time it is pointed out that the shaft 89 is also reciprocally movable by the hand wheel 90 for effecting the retraction of the gear 91 so that it is not in mesh with the gear 79 whereby the gear 91 and the hand wheel 90 will not normally rotate during the operation of the molding machine 50.

Referring now to FIGURE 35, it will be seen that each frame member 73 is provided with a continuous circular T-slot 92 therein. The frame member 73 has been illustrated as being of a two-piece construction including a separate L-shaped part 93 which is secured to the main portion of the frame member by means of circumferentially spaced bolts 94 as is shown, for example, in FIGURE 8. However, the frame members 73 may be of a one-piece construction, if it is so desired.

Each of the frame members 73 carries a plurality of interchangeable yokes or brackets 95 of which a typical yoke 95 is illustrated in FIGURE 35. Each yoke 95 has a generally rectangular base portion 96 and a tapered outer portion 97. The outer end of each yoke 95 is provided with an elongated slot or socket 98, which, when the yoke 95 is mounted on the frame member 73, is radially disposed, as is clearly shown in FIGURE 34. The base 96 of each yoke 95 is provided with two slots 99 which open through the inner end of the yoke.

Each yoke 95 is interchangeably, adjustably secured to the associated frame member 73 by means of a pair of T-bolts 100 having heads 101 for reception in the T-slot 92. The bolts 100 extend through the slots 99 in the yoke 95 and adjacent bolts 100 of adjacent yokes are provided with clamp bars 102 which, in cooperation with nuts 103 on the T-bolts 100, serve to clamp the yokes 95 against an outer mounting face 104 of the frame member 73. In order that an accurate controlled spacing may be maintained between adjacent yokes 95, each yoke 95 is provided adjacent each slot 99 with a pin 105. A strap 106 is engaged over adjacent pins of adjacent yokes and thus maintains the proper spacing between adjacent yokes. In order to prevent accidental displacement of each strap, it is secured to one of the pair of yokes by means of a bolt 107.

At this time it is pointed out that in accordance with this invention, the yokes 95 illustrated in FIGURES 34 and 35 may be removed from the frame members 73 and replaced by other yokes having slots or sockets 98 which are spaced a distance different from that shown in FIGURE 34. When the spacing between the slots or sockets 98 is varied, the widths of the yokes will be likewise varied so that a larger or smaller number of yokes may be mounted on the frame members 73, as desired. The purpose of this desired interchangeability of yokes will become apparent hereinafter.

The yokes 95 carried by the frame members 73 are disposed in transverse alignment. Each transversely aligned pair of yokes supports a mold support unit, generally referred to by the numeral 108. Each mold support unit 108 includes a tubular support shaft 109 which is provided in opposite ends thereof with plugs 110. Each plug 110 carries an eccentrically positioned shaft 111 on which there is mounted for relative rotation a slide block 112. The slide blocks 112 are mounted in the slots 98 of the yokes 95 for relative sliding movement.

The support shaft 109 is provided at each end thereof with a sleeve 113. The sleeves 113 are disposed in alignment and are in offset parallel relation with respect to the support shaft 109. Each sleeve 113 is secured to the respective support shaft by a pair of bracket plates 114 and 115.

The support shaft 109 is provided with intermediate areas of reduced cross section, the intermediate portions of the support shaft 109 being referred to by the numeral 116. On each intermediate portion 116, there is mounted for sliding movement a mounting plate 117 for the supporting of a mold. Each mounting plate is provided with a bushing or bearing 118 which is of the split type for facilitating the mounting of the associated mounting plate 117 on the support shaft 109, and is releasably secured in place by a removable bearing cap 117a. Each mounting plate 117 is secured to an inner end of a control shaft 119, the control shaft 119 having a pin portion 120 which is received into an opening 121 in the respective mounting plate 117 and which is keyed thereto by means of a key 122 to prevent the rotation of the associated control shaft 119. Each mounting plate 117 is rigidly secured to its associated control shaft 119 by means of suitable bolts 123.

It is to be noted that each control shaft 119 extends through an associated sleeve and is mounted therein for sliding movement by means of bushings 124. The outer end of each control shaft 119 is bifurcated, as at 125, and has a shaft 126 extending across the bifurcated end. The shaft 126 carries a centrally located cam track follower 127. The second cam track follower 128 is carried by the shaft 126 to one side of the bifurcated end of the control shaft. At this time it is pointed out that the cam track followers 127 and 128 will engage suitable cam tracks to be described hereinafter for the purpose of moving the mounting plates 117 towards and away from one another.

Each of the mounting plates 117 carries a mold half mounting pad. As is viewed in FIGURE 8, the left-hand mounting plate 117 carries a pad 129 which is fixedly secured thereto. The right-hand mounting plate 117 carries a resiliently mounted pad 130. The details of mounting the pad 130 on its associated mounting plate 117 are best shown in FIGURES 13 and 14. The pad 130 is provided with a series of annular recesses 131 with each recess 131 defining and surrounding a boss 132. The associated mounting plate 117 is provided with a plurality of circular sockets 133 each having a reduced diameter bore extension 134 opening through the outer surface of the mounting plate. The sockets 133 are aligned with the recesses 131 and a coil spring 135 is seated in each socket and recess combination. The spring pad 130 is held against separation from the associated mounting plate 117 by means of a bolt 136 threaded into a bore 137 in each boss 132. The bolt passes through a bushing 138 which is seated in the bore 134 and has a shoulder 139 which bears against the outer surface of the mounting plate 117 to thus limit the relative movement of the spring pad 130 with respect to the associated mounting plate 117.

It is to be understood that only the four corner sockets 133 have bolts and bushings passing therethrough and that the other spring sockets 133 have associated therewith spring sockets 140 devoid of bosses as opposed to the recesses 131.

Each of the pads 129 and 130 has secured thereto a mold half, the mold halves being slightly different with the mold half secured to the pad 129 being generally referred to by the numeral 141 and the mold half secured to the spring pad 130 being generally referred to by the numeral 142. The mold halves 141 and 142 combine to define a mold generally referred to by the numeral 143, and each mold half is secured to its associated pad by means of a plurality of bolts 144 in the manner generally shown in FIGURE 14.

Referring now to FIGURE 3 in particular, it will be seen that in a cycle of operation of the molding machine 50, a mold 143 is closed, then interlocked in this closed position and then unlocked, and finally opened. Further, it is to be noted that each mold does not follow a continuous circular path, but that the path of the molds includes two straight portions, one during the charging of the mold and one during the removal of the molded article from the mold. In order to facilitate the guiding of the molds around their predetermined path, there is carried by the frame units of the frame 51 a guide track, generally referred to by the numeral 145. Each guide track includes a plate 146 which is secured to respective ones of the frame members of the frame 51. The plate 146 has an outline which corresponds generally to the outline of the mold path shown in FIGURE 3 and has secured to the inner surface thereof a pair of ring members 147 and 148 which combine to define a guideway 149. The guideway 149 also has a configuration which corresponds to the mold path shown in FIGURE 3.

Each bracket plate 114 is provided with a fixed pair of tubular members 150 in which there are threaded shafts 151 of followers 152. The shafts 151 of each pair of followers 152 lie in a plane disposed substantially normal to a plane passing through the axes of the respective support shaft 109 and control shaft 119. It will be readily apparent that the action of the followers 152, combined with the shape of the guideway 149, serves to control the path of the associated mold 143 with the result that for the most part of the travel of a mold, it passes along a circular path and is spaced equidistant from adjacent molds. However, when a mold 143 approaches a straight portion of its path, such as is shown in FIGURE 3, the effect of the guideway 149 on the followers 152 is to both move the mold inwardly towards the center of the shaft 66 and towards an adjacent mold in the direction of travel of the molds. As a result, the slide blocks 112 slide in the yokes 95 and the shaft 109 rotates relative to the slide blocks 112. Reference is made to FIGURE 6 in particular, wherein it is shown that when the followers 152 are in the straight portions of the guideway 149, the corresponding molds are disposed closely adjacent one another whereas when the followers 152 are in the arcuate portions of the guideway 149, the molds are further outwardly disposed and are in circumferentially spaced relation.

The machine 50 also includes cam tracks which are suitably supported from brackets carried by the frame 51. These cam tracks include a pair of mold closing cam tracks 153 which are shown in FIGURE 7 and which are engaged by the cam followers 127 to force the control shafts 119 inwardly to mold closing positions. After the molds have been closed, the molds are locked in their closed positions so that there is no need for the cam track to extend entirely around the frame of the machine nor is the frictional engagement between the cam followers 127 and their associated cam tracks required for this distance.

Reference is now made to FIGURES 38 and 39 wherein it will be seen that the cam tracks include a safety cam track section 155 which is provided along the path of travel of the molds wherein the molds are latched so as to prevent the accidental opening of the molds. At the termination of the cam track 155, there is provided a cam track 156 at each side of the machine for receiving the cam followers 128. The cam track 156 includes a guideway 157 through which the cam followers 127 and 128 pass. The effect of the cam tracks 156 is to first move the control shafts 119 slightly inwardly to compress the springs 135 to allow unlocking of the molds and then outwardly to effect the opening of the molds, as is shown in FIGURE 39. Further cam tracks 158 extends from the cam tracks 156 to the cam tracks 153 to assure the holding of the molds in their opened positions. The cam tracks 158 are engaged by the cam followers 128 in the manner shown in FIGURE 39.

Each mounting plate 117 is provided with a lock generally referred to by the numeral 159, for locking the mounting plate and its associated control shaft in a mold closing position. Each lock includes a generally circular plate 160, as is best shown in FIGURE 11. The plate 160 is mounted on the outer face of the mounting plate 117 and surrounding the control shaft 119 by means of a retainer 161 (FIGURE 8) which is suitably secured to the mounting plate 117. The mounting plate 117 is provided with a pin 162 which is received in an arcuate slot 163 in the plate 160 to limit the rotation thereof.

Each lock plate 160 is provided with a plurality of circumferentially spaced fingers 164 which are spaced outwardly a sufficient distance so as to telescope over the associated sleeve 113 when the mounting plate 117 is in a mold opening position. After a mold has been closed, the fingers 164 have their outer ends generally aligned with stop elements 165 carried by the sleeve 113 for engagement by the fingers 164.

The fingers 164 are normally urged into alignment with the stop elements 165 by means of a coil spring 166 which has one end secured to a pin 167 carried by a projecting ear 168 of the plate 160. The opposite end of the spring 166 is connected to a pin 169 which is carried by a small mounting bracket 170 secured to the respective mounting plate 117.

The ear 168 is provided with a cam follower 171 which is engageable with a cam. When the mounting plates 117 are moved inwardly to mold closing positions, the plates 160 of the locks 159 are automatically rotated to engage the fingers 1644 with the stop elements 165 by the actions of the springs 166. In order to unlock the mounting plates 117 prior to the opening of the molds 143, there are provided cams 172 for engagement by the cam followers 171. These cams are shown in FIGURES 36 and 37 as being carried by a plate 173 secured to the underside of the beam 62. Slightly before the cam followers 171 are moved by the cams 172 to rotate the plates 160 and the fingers 164, the cam tracks 157 act on the cam followers 127 to move them inwardly slightly. This causes springs 135 to further compress so as to relieve the pressure on the fingers 164 and the stop elements 165 allowing them to be easily disengaged. At the time the plates 160 are rotated to positions where the fingers 164 clear the stop elements 165, the cam followers 128 then engage the cam tracks 156 and the control shafts 119 are moved outwardly so that at the time the cam followers 171 moves out of engagement with the cam tracks 172, the fingers 164 are disposed alongside the stop elements 165 and the control shafts 119 and their mounting plates 117 are free for further outward movement in the opening of a mold.

Reference is now made to FIGURES 16 through 21 which show the general details of construction of the mold halves 141 and 142. Considering first the mold half 141, it will be seen that it is of a two-piece construction and includes a generally channeled cross sectional shaped shell 174 which is closed by a plate 175 which is of a recessed construction so as to define one half of the cavity of the mold 143. The plate 175 is removably secured to the shell 174 by a plurality of fasteners 176, as is clearly shown in FIGURE 19. It is to be noted that the plate 175 is to be sealed relative to the shell 174 so that no coolant, which is circulated within the mold half 141, may escape through the joint between the shell 174 and the plates 175. In order that coolant may be circulated through the mold half 141, it is provided with a pair of pipes 177 and 178 which are vertically spaced and of which one is an inlet and the other is an outlet.

The mold half 142 is of a construction similar to the mold half 141 and includes a shell 179 to which there is secured a contoured plate 180 by means of a plurality of fasteners 181. It is to be understood that the plate 180 is sealed with respect to the shell 179 and has a contour corresponding to the contour of the plate 175 so that the plates 175 and 180 combine to define the cavity of the mold 143. The shell 179 is provided with a pair of coolant pipes 182 and 183 of which one is an inlet and the other is an outlet.

In order that the mold halves 141 and 142 may clamp and seal off a portion of an extruded plastic tube, one end of each of the plates 175 and 180 is provided with an insert 184 which is located in the position best shown in FIGURE 18. It is to be understood that the inserts 184 will sufficiently clamp a portion of a tube to effect the complete collapsing and sealing thereof.

The opposite ends of the plates 175 and 180 are recessed and have seated therein blocks 185 and 186, respectively. The blocks 185 and 186 are of similar configurations but differ in a minor manner, as will be set forth hereinafter. The blocks 185 and 186 are contoured to define a reduced mold portion 187 which, in the illustrated mold, defines the neck of the bottle to be molded. The reduced mold portion 187 terminates in a further reduced mold portion 188 which is generally of a cross section corresponding to the tube which is to be received in the mold 143. The tube receiving portions of the blocks 185 and 186 then flare outwardly as at 189 to define generally a clamped off portion. The blocks 185 and 186 carry separate plates 190 which have mating cutting edge portions 191, as is shown in FIGURE 21, to effectively seal and substantially cut off the section of a tube gripped by the mold 143. The block 185 differs from the block 186 in that it is provided with a bore 192 for the reception of a blow needle 193 which will be described in more detail hereinafter, and the block 186 is provided with a bore 194 for the reception of a knock-out rod 195 to be described in more detail hereinafter.

The general function of a mold 143 is set forth here in order that further constructional details of the mold may be understood. After a section of a tube has been clamped within the mold 143, and the mold securely closed, the blow needle 193 is projected into the tube through the reduced cross sectional portion 188 of the mold. A suitable blow fluid, preferably air, is introduced into the clamped off section of the tube and the clamped off section of the tube is then blown to conform to the internal contour of the mold 143. At the conclusion of the molding operation, the blow needle 193 is withdrawn and at the time the mold 143 is opened, the knock-out rod 195 is projected into the portion 188 of the mold half 142 with the result that the molded article, such as a bottle, is forced out of the mold half 141 to facilitate the final removal of the molded article from the mold 143.

Referring now to FIGURE 12 in particular, it will be seen that the spring pad 130 is provided with a notch 196 which is aligned with a like notch 197 in the associated mounting plate 117. The notches 196 are provided for the passage of the knock-out rod 195. The knock-out rod 195 also passes through a suitable bore 198 in the shell 179. The knock-out rod 195 carries a washer 199 which bears against the associated mounting plate 117 and bridges the notch 197. The knock-out rod 195 is also provided with a stop member 200 in the outer end thereof. A coil spring 201 extends between the stop member 200 and the washer 199 and serves to urge the knockout rod 195 to a retracted position so as to hold the same in the position shown in FIGURE 21. It is to be noted in FIGURES 15 and 21 that a negative clearance space 202 is provided in front of the knock-out rod 195 which fills with plastic material during a molding operation so that a plastic boss is molded therein which will retain the molded article in the mold half 142 when the molds are opened.

Referring now to FIGURES 12 and 15 in particular, it will be seen that the pad 129 and its associated mounting plate 117 are recessed, generally at 203 to provide clearance for a blow needle assembly, generally referred to by the numeral 204. The blow needle assembly 204 includes a cylinder 205 having an inner end plate 206 and an outer end plate 207. The cylinder 205 is received within opposed recesses in the end plates 206 and 207 and bolts 209 extend through the end plates 206 and 207 around the cylinder 205 and are threaded into the shell 174 to mount the blow needle assembly 204. The end plate 206 has a center bore 210 therethrough which is aligned with a bore 211 in the shell 174. The bore 211 is aligned with the previously mentioned bore 192 in the block 185. A piston 212 is mounted mentioned the cylinder 205 for reciprocation and is sealed relative thereto by suitable sealing rings 213. The piston 212 carries a piston rod 214 which extends through the bore 210 into the bore 212. The piston rod 214 is sealed with respect to the end plate 206 by means of a sealing ring 215. The blow needle 193 is provided with an enlarged hollow end 216 and the blow needle 193 is removably threaded on the inner end of the piston rod 214. At this time it is pointed out that the piston 212 and the piston rod 214 are provided with a continuous passage 217 which opens into a passage 218 through the blow needle 193.

The end plate 206 is provided with a passage 219 which opens into the area defined by the cylinder 205 and a threaded fitting 220 connects a pipe 221 to the end plate 206. The end plate 207 is provided with a bore 222 which corresponds to the bore 210 and which also opens into the area defined by the cylinder 205. A threaded fitting 223 couples a pipe 224 to the passage 222.

It will be seen that when air is introduced into the cylinder 205 through the passage 219 it will act directly upon the piston 212 and urge the piston 212 to the left to a position wherein the blow needle 193 is retracted. When it is desired to blow an article within the mold 143, air or other blow fluid is introduced into the cylinder 205 through the passage 222. The first inrush of air reacts on the piston 212 to move the same to the right and to project the blow needle 193 into the section of the tube clamped off by the mold 143. When the piston 212 becomes seated against the end plate 206, air then passes through the passage 217 and the passage 218 into the interior of the clamped off section of the tube.

A control valve, generally referred to by the numeral 225, is provided for each blow needle assembly 204. The control 225 is secured to the respective mounting plates 117 at the end thereof opposite from the blow needle assembly and includes a mounting flange 226 (FIGURE 23) which is secured to the mounting plate 117 by means of bolts 227. The mounting flange 226 has threaded therethrough a barrel 228 which is provided at the opposite end thereof with a bracket 229. A spool valve member 230 is slidably mounted within the barrel 228 and is prevented from rotating by means of a guide key 231 carried by the barrel 228 and engaging a suitable keyway in the valve member 230. The valve member 230 has a shank portion 232 which is bifurcated on its outer end and which extends out through one end of the barrel 228 and the mounting bracket 229. The mounting bracket 229 includes a bifurcated portion 233 which carries a pivot pin 234. A valve actuator 235 is pivotally mounted on the pivot pin 234 and is provided at one end thereof with a cam follower 236. The opposite end of the actuator 235 is bifurcated and is engaged over a pin 237 carried by the bifurcated shank 232. Thus, when the actuator 235 is pivoted, it serves to move the valve member 230 within the barrel 228.

The valve member 230 is provided with a pair of annular recesses 238 and 239. The recess 239 is provided with a longitudinal extension 240. The barrel 228 is provided with an inlet pipe 241 which is connected to the barrel 228 by means of a fitting 242. The barrel 228 has an inlet passage 243 which splits into passages 244 and 245.

The barrel 228 has two pipes 221 and 224 extending from the opposite sides thereof with the pipe 221 being connected to the barrel by means of a fitting 248 and the pipe 224 being connected to the barrel by means of a fitting 249. The barrel has passages 250 and 251 aligned with the fittings 248 and 249, respectively. The barrel 228 is also provided with a centrally located vent opening or passage 252. Air behind the piston 212 is vented out through the pipe 224 and through the vent passage 252.

Referring now to FIGURE 24 in particular, it will be seen that when the valve member 230 is in its innermost position, air or other blow fluid passes into the barrel 228 through the passage 243 and the passage 244. The air then passes through the annular recess 238 and out through the passage 250 into the pipe 221. The air enters into the cylinder 205 from the pipe 221 and acts on the piston 212 to hold the piston 212 in its retracted position.

Referring now to FIGURE 25, it will be seen that when the spool valve member 230 is shifted to the opposite end of its travel, the annular recess 239 becomes aligned with the inlet passage 245 while the annular recess 238 becomes aligned with the vent opening 252. At this time an extension 246 of the annular recess 238 is aligned with the opening 250. Thus air is vented out of one end of the cylinder 205 through the pipe 221, the passage 250, the valve member 230 and the vent passage 252. At the same time, air is being directed into the opposite end of the cylinder 205 through the inlet passage 245, through the annular recess 239 of the valve member 230, out through the passage 251 and through the pipe 224. The piston 212 is shifted from the position shown in FIGURE 24 to the position shown in FIGURE 25 with the result that the blow needle 193 passes through a wall of the tube clamped within the mold 143. Immediately thereafter, air flows through the passage in the piston 212 and the blow needle 193 so that air under pressure enters into the section of the tube clamped and sealed within the mold 143 to effect the blowing thereof.

Referring now to FIGURE 26, it will be seen that the spool valve member 230 has an intermediate position wherein the inlet passages 244 and 245 are closed. In this position of the valve member 230, the extension 240 of the annular recess 239 bridges the passages 251 and 252 so that air may be vented from within a blown article through the pipe 224. In this manner, internal pressure within the blown article may be relieved before the blow needle 193 is withdrawn.

Three cams are provided for engagement by the cam follower 236 of the valve actuator 235. The first of these cams is shown in FIGURE 22 and is referred to by the numeral 253. It is to be noted that the cam 253 is of a simple construction and serves merely to shift the valve actuator 235 from one extreme position to another. The second cam, which is referred to by the numeral 254, is shown in FIGURE 29 and is supported from a bracket 255 which position is best shown in FIGURE 1. The bracket 255 is supported from one of the frame members 54. The cam 254 is also of a simple configuration and serves to shift the control valve 225 to its neutral position of FIGURE 26 wherein air pressure is bled from within the molded article. The third of these cams is the cam 256 which is mounted at the upper part of the machine 50 in the position best shown in FIGURES 36, 38 and 39. The cam 256 is also of a simple construction and serves to shift the control valve 225 from its neutral position of FIGURE 26 to its closed position of FIGURE 24 wherein the blow needle 193 is moved to a retracted position.

At this time it is desirable to point out that coolant is delivered to the rotating mold halves and air is delivered to the rotating control valves 225. Referring to FIGURE 33, for example, it will be seen that the paddle wheel 78 is provided within the interior thereof with three manifolds. These manifolds include a coolant supply manifold 259, a coolant return manifold 260 and an air supply manifold 261. The coolant supply manifold 259 has a flexible hose 262 extending therefrom to the respective pipes of the mold halves 141 and 142, which pipes could be, for example, the pipes 177 and 182. The coolant return manifold 260 has a pair of hoses 263 extending therefrom for each of the molds 143 with the hoses 263 being connected to the pipes 178 and 183 of the two mold halves 141 and 142, respectively. For each of the control valves 225, there is a hose 264 which extends from the supply pipe 241 to the air manifold 261.

Coolant is supplied to the coolant supply manifold 259 through a plurality of hoses 265. The coolant is delivered from the coolant return manifold 260 through a plurality of hoses 266. Air is supplied to the air supply manifold 261 through a plurality of hoses 267.

Referring now to FIGURE 30, it will be seen that the left end 68 of the main shaft 66 is provided with a coolant supply passage 268 which extends axially therethrough to a point short of the center of the main shaft 66. A plurality of radiating and longitudinally spaced passages 269 extend from the passage 268 through the main shaft 66. Each passage 269 terminates in a fitting 270 which is utilized to couple one of the hoses 265 to the main shaft 66.

Coolant is supplied into the rotating shaft 66 through a conventional type of rotating union 271 which is secured to an adaptor plate 272 which is suitably bolted to the left end of the main shaft 66. Coolant is supplied into the union 271 through a coolant supply pipe 273 which is provided with a control valve 274 and a temperature indicator 275.

The main shaft is provided with a second axial passage 276 which opposes the passage 268 and terminates short of the center of the main shaft 66. The inner end of the passage 276 has extending radially outwardly therefrom longitudinally spaced sets of passages 277. Each passage 277 is provided at its outer end with a suitable fitting 278 to which one of the hoses 266 is connected. The passage 276 extends through the right end of the main shaft 66 to which there is connected an adaptor plate 279. Another conventional type of rotating union 280 is carried by the adaptor plate 279, and a coolant return pipe 281 is carried by the rotating union 280.

A bore 282 of a reduced diameter, as compared to the passage 268, extends axially from the inner end of the passage 268 and constitutes an air supply passage. A plurality of passages 283 extend radially outwardly through the main shaft 66 from the air supply passage 282. Each passage 283 is provided at its outer end with a fitting 284 to which one of the hoses 267 is coupled. The bore or passage 282 has an enlarged threaded outer portion 285 into which is threadedly engaged an air supply pipe 286. The outer end of the air supply pipe 286 extends to the general confines of a pipe fitting 287 which is carried by the rotating union 271 and to which the coolant supply pipe 273 is connected. Within the pipe fitting 287 there is secured to the air supply pipe 286 another conventional rotating union 288 to which a main air supply pipe 289 is coupled. The main air supply pipe 289 extends out through a sealed fitting 290 carried by the pipe fitting 287. A suitable air pressure control valve 291 is incorporated in the main air supply pipe 289.

Reference is now made to FIGURES 1 and 6 wherein there is illustrated a portion of a conventional type of plastic extruder, generally referred to by the numeral 292. The extruder 292 includes an extrusion die head 293 from which a continuous plastic tube 294 is extruded. It is to be noted that the plastic tube 294 is extruded in a straight vertical line in alignment with a group of closely associated molds 143 which are also in a straight line alignment. Of the three illustrated molds in alignment, the uppermost mold is open, the central mold has just closed, and the bottom mold has had a newly extruded tube blown therein.

It is to be understood that for the most part of the movement of the molds 143 about the paddle wheel 78, the blown article is being cooled within the molds. In accordance with the machine of this invention, the blown articles are removed at the upper portions of the mold travel as is generally shown in FIGURES 36 through 39. The path of the molds 143 includes another straight line portion wherein the molds are opened and the molded articles removed therefrom. The molded articles are received in a chute setcion, generally referred to by the numeral 295, which includes a movable horizontal portion 296, and a fixed portion 297. The chute portion 296 is supported by a pair of depending arms 298 which are pivotally mounted on a horizontal pivot pin 299. The pivot pin 299 is carried by a suitable mounting bracket 300 which is supported by a central portion of the beam 62. The chute portion 296 is held in a normally lowermost position by means of a weight 301 mounted on the chute portion 296 between the arms 298. The chute portion 296 is provided with a handle 302 to facilitate the upper lifting of the chute portion 296 when desired. It is to be understood that an article dispensed from a mold 143 will first enter into the horizontal portion 296 and then through the portion 297. There are instances, however, when an article does not properly enter the chute portion 296 and will jam against the chute. It is for this purpose that the chute portion 296 is pivotally mounted. It is also desired to discontinue the operation of the molding machine 50 in the event of a jam up. Accordingly, the bracket 300 is provided with a depending extension 303 which supports a switch 304 having an actuator 305. The actuator 305 is normally held in a depressed position by an adjustable abutment 306 carried by an ear 307 extending from one of the arms 298. It is to be understood that when the chute portion 296 is lifted either manually by grasping the handle 302 or by the pressure of jammed articles against the horizontal chute portion 296, the switch actuator 305 will be released which results in the shutting down of the machine and also preferably the extruder 292.

A molded article is stripped from the mold half 142 at the time of the opening of a mold by the action of the knock-out pin 195. The operation of the knock-out pin 195 is automatic at the time of the opening of the mold in that an adjacent support plate 115 carries an annular bracket 308 in alignment with the associated knock-out pin 195. The bracket 308 is provided with a suitable member 309 which is adjustably mounted and which is aligned with the knock-out pin, as is clearly shown in FIGURE 39. When a mold 143 is opened, the knock-out pin 195 moves with its associated mold half until it engages the stop member 309. Further movement of the mold half results in the compressing of the spring 201 with the result that the knock-out pin 195 remains stationary. This relative movement of the mold half 142 with respect to the knock-out pin 195 results in the forcing of the leading portion of the molded article out of the mold half 142. Although only one knock-out pin per mold has been illustrated, it is to be understood that other knockout pins may be provided and if desired, the knock-out pins could be in diagonal relationship so that the molded article may be forced out of both mold halves. The molded article will almost always remain in the mold half 142 when the mold is opened due to the plastic material filling the negative clearance space 202 in front of the pin 195 forming a boss which must forcibly be ejected by the pin 195 as priorly explained.

Referring now to FIGURE 37 in particular, it will be seen that the horizontal chute portion 296 of the chute section 295 includes a bottom wall 310 which underlies a mold 143 as it is being opened so that there is no possibility of a molded article dropping out of a mold and down into the interior of the molding machine 50.

Referring now to FIGURE 39 in particular, it will be seen that the side walls of the horizontal chute portion 296 are disposed closely adjacent the mold half 141 and the mold half 142 in their opened positions whereby positive stripping of an occasional sticking molded article from the mold halves, particularly the mold half 141, is assured. The horizontal chute portion 296 is provided with a curved deflector 311 which cooperates to deliver the removed articles into the chute section 296. Also, there is provided an air blast nozzle 312 (FIGURE 37) adjacent the open end of the horizontal chute portion 296 and in an offset position to assure not being contacted by a released molded article. The air blast nozzle 312 is carried by a depending pipe 313 which is carried by a pressure control valve mechanism 314 which is suitably mounted on a bracket 315 carried by the beam 62.

The chute section 296 delivers bottles into a chute section 297. The chute section 297 is carried by a bracket assembly 317 suspended from a transverse frame member 318. The transverse frame member 318, as is clearly shown in FIGURE 1, is supported by a pair of upstanding frame members 319 which, in turn, are carried by the frame member 54 at each side of the molding machine 50. The chute section 297 will deliver the molded articles onto an endless take-away conveyor 320.

Operation

Reference is now made to FIGURES 3 and 4 wherein the general sequence of operation of the molding machine 50 is shown. The extruder 292 continuously extrudes the tube 294 which may be of any desired material, although plastics are the preferred materials. As the molds 143 approach the extruder 292, they are moving along a circular path and are relatively widely spaced. As the molds 143 approach the extruded tube 294, the followers 152 enter into the straight portions of the guideway 149 which correspond to the path of movement of the extruded tube. These straight portions, one on each side of the molding machine 50, are referred to by the numeral 322 and one thereof is clearly shown in FIGURE 27. The movement of the followers 152 from opposed upper arcuate portions of the guideway 149, which arcuate portions are referred to by the numeral 323, to the straight portions 322 results in the shifting of the molds 143 relative to one another. It is to be noted that the molds 143 are moved inwardly towards the center of the molding machine 50 and due to this inward movement, become more closely associated, as is clearly evidenced by the spacing of the followers 152 in FIGURE 27.

As a mold moves adjacent the extruded tube 294, the mold halves 141 and 142 are open. However, as the mold halves 141 and 142 pass on opposite sides of the tube 294, the cam followers 127 of the associated control shafts 119 engage the opposed cam tracks 153 and the mold halves 141 and 142 are brought together. At the time the mold halves 141 and 142 are moved to engage the tube 294, the tube 294 is in alignment with the mold halves. This is clearly shown in FIGURE 6.

As the mold 143 closes about a section of the tube 294, the upper portion of that section is effectively clamped between the inserts 184 and sealed closed while the lower portion of the tube section is clamped between the inserts 185 and 186, as well as the plates 190, and the lower portion of the tube is sealed closed.

Immediately after a mold 143 is closed, the cam follower 236 of the actuator 235 for the associated control valve 225 engages the cam 253 so as to shift the control valve to its position of FIGURE 25 with the result that the blow needle 193 is projected through the clamped off section of the tube 294 and air under pressure is introduced thereinto to effect the blowing of the tube section into a molded article 324.

At the time the mold 143 comes to a fully closed position, the springs 166 of the locks 159 for the mold halves 141 and 142 move the locks to their positions wherein the mold halves 141 and 142 are retained in closed positions. It is also pointed out at this time that the complete closing of the mold 143 is assured due to the resilient mounting of the pad 130 on the mold half 142. After the mold has been locked in a closed position, it is no longer necessary for the cam followers 127 to engage a cam track, such as the cam tracks 153. However, the safety cam track section 155 may continue around each side of the machine frame 51 so that in the event any of the locks should fail, accidental opening of a mold and the jamming of the machine will be prevented.

For a major portion of the travel of a mold about its predetermined path, which is controlled by a pair of opposed arcuate guideway sections 325, there is no operation of the machine on the molded article 324 with the exception of the fact that coolant it circulated through the mold halves and the article is being cooled and set. This continues until the mold approaches the upper part of its travel at which time the cam follower 236 engages the cam 254 and the control valve 225 is moved to its position of FIGURE 26 to effect the venting of the blown article.

This occurs at least several stations in advance of the discharging of the blown article from its associated mold 143. The mold continues in its upward travel and the mold is again changed from its arcuate path of movement to its straight line path of movement by the followers 152 entering into another pair of opposed straight guide track portion 326, as is clearly shown in FIGURE 38. Immediately after the molds 143 begin their straight line travel at the top of the molding machine 50, the cam follower 236 of the control valve actuator 235 for the mold enters into the cam 256. The cam 256 serves to shift the control valve 225 to the position of FIGURE 24 wherein the blow needle 193 is retracted. Generally at the same time the blow needle is retracted, the cam followers 127 engage the cam tracks 156 for compressing the springs 135; the cam follower 171 of each lock 159 engages a fixed cam 172 and each lock 159 is moved to and momentarily held in a released position. While the locks 159 are in their released positions, the cam followers 128 engage the cam tracks 156 so as to move the mold halves 141 and 142 apart. The locks 159 are shifted relative to the sleeves 113, and are prevented from being engaged, by means of the springs 166.

As the mold halves 141 and 142 open, the knock-out pin 195 of the mold half 142 engages the stop member 309 and serves to force the molded article 324 out of the mold half 142. The molded article 324 is then received within the chute section 295 and is delivered from the molding machine 50.

After the cam followers 128 become disengaged from the cam tracks 156, they engage cam tracks 158 so as to prevent the accidental closing of the molds. At this time the followers 152 enter into arcuate portions 323 of the guideway 149 and the molds are guided in a circular path until they again approach the straight guideway sections 322.

Reference is now made to FIGURES 40 and 41 wherein there is illustrated a modified form of cam which may be used to replace both the cam 254 and the cam 256. This modified form of cam is generally referred to by the numeral 327 and will be positioned generally in the position of the cam 256 and serves the dual purpose of the two cams 254 and 256. It is to be noted that the cam 327 has an entrance portion 328, an offset portion 329 which leads into an intermediate straight portion 330, a second offset portion 331, and a final discharge portion 332. When the cam follower 236 enters into the cam 327, the control valve 225 is in the position illustrated in FIGURE 25. The cam 327 serves to shift the control valve 225 to the vent position of FIGURE 26 for a short period of time corresponding to the time of travel of the cam follower through the straight portion 330 of the cam 327. The cam follower 236 is then shifted to the position where the control valve 225 is shifted to its position of FIGURE 24 to withdraw the blow needle 193.

Referring to FIGURES 43, 44 and 45 in particular, it will be seen that there is a modified form of mold construction which is generally referred to by the numeral 333. Each mold 333 is formed of two molding halves 334 and 335 which correspond to the mold halves 141 and 142, respectively. Each of the mold halves 334 and 335 is constructed primarily of a shell 336 and a contoured plate 337, which are secured together in sealed relation. The upper portion of the molding halves 334 and 335 correspond to the upper portions of the molding halves 141 and 142, respectively. Only the lower portions of the molding halves 334 and 335 differ from the molding halves 141 and 142.

Referring to FIGURE 45 in particular, it will be seen that the mold halves 334 and 335 have lower insert blocks 338 and 339, respectively. The insert block 338 differs from the insert block 339 in that it is provided with a passage 340 therethrough for the blow needle 193. No opening is illustrated in the insert block 339. However, if it is so desired, it may be provided with a bore for a knock-out rod, such as the knock-out rod 195.

The insert blocks 338 and 339 have opposed lower recessed areas 341 in which track members 342 are mounted by means of bolts 343. The insert blocks 338 and 339 have slidably mounted therein composite inserts, generally referred to by the numeral 344. Each insert 344 includes an upper plate 345 having a depending outer rib 346 which is locked behind its associated track 342. Each insert 344 also includes a lower pinch-off plate 347 having an upstanding outer rib 348 which is also engaged behind the respective track 342. A spacer block 349 is disposed between the plates 345 and 347 and the plates 345 and 347 and the block 349 are connected together by bolts 350 for movement as a unit. Referring now to FIGURE 43 in particular, it will be seen that each block 349 is of a greater length than the plates 345 and 347. The block 349 extends to opposite sides of each mold half and one end of each block 349 is provided with an upstanding stop pin 351 to limit the movement of the insert unit 344 to the right. At the right end of the blocks 349 is an upstanding member 352 which has a spring fitting 353 formed therein. A spring 354 is seated in the spring fitting 353 and reacts against the opposed side of the mold half. Thus, the insert units 344 are normally held in the position shown in FIGURES 43, 44 and 45.

It is to be noted that the lower portion of the mold 333 corresponds in outline to the lower portion of the mold 143 as far as the base of the molded article is concerned. The insert units 344 combine to define a flaring pinch-off portion 355 and the plates 347 come together, as at 356, to substantially shear off a pinched-off section of the tube. It is to be noted that due to the taper of the pinch-off portion 355, relatively sharp cutting edges 357 are formed along the upper surface of the plates 345. This cutting edge 357 is circular in complete outline, as is best shown in FIGURE 44.

It will be readily apparent that after an article has been blow molded within the mold 333, and the insert units 344 are shifted to the left, as viewed in FIGURE 43, there will be a shearing off of the pinched-off portion of the associated tube section. This can be accomplished at a convenient location in the movement of the mold 333 around a molding machine, such as the molding machine 50.

At this time it is also pointed out that a bore 358 is formed through the insert 344 at a line of meeting and that this bore is alignable with the neck portion of the molded article for venting the same when the insert units 344 are moved to the left in FIGURE 43.

In the normal operation of the blow molding machine 50, as the molds 143 move apart, there is a separation of the pinched-off sections of the tube 294, as is shown in FIGURE 6. However, while the amount of tube waste has been reduced to a minimum by the construction of the molding machine 50, there is still a large amount of heat retained in those portions of the pinched-off tube sections which are waste material, and the purpose of the construction of the molds 333 is to quickly remove the waste at the neck end of the molded article and thereby eliminate the heat load of the waste tube section. Air through the needle 193 will blast into the molded article and out through the bore 358 to additionally carry heat out of the molded article.

Reference is now made to FIGURE 42 wherein a modified sequence of operation of the molding machine 50 is illustrated. It is to be understood that only those steps having to do with the mold 333 in particular are shown, and that the remainder of the sequence of operation of the blow molding machine 50 utilizing the molds 333 is the same as that shown in FIGURE 4. A slightly modified form of control valve is utilized with the mold 333. The control valve is generally referred to by the numeral 359 and differs from the control valve 225 only in a minor change in the shape of the spool valve member 360 thereof. The control valve 359 does not have an article venting position corresponding to that shown in FIGURE 26. Therefore, the shape of the passage extension which corresponds to the passage extension 240 of the control valve 225 is slightly modified. The valve member 360 is provided with a pair of annular passages 361 and 362 which correspond to the pasages 238 and 239. Each of the passages 361 and 362 is provided with extensions which face in opposite directions, the passage 361 having an extension 363 and the passage 362 having an extension 364.

When the mold 333 is open prior to the reception of the extruded tube 294 therein, the spool valve member is in its fully retracted position and air is delivered into the cylinder 205 through the pipe 221 so as to retain the blow needle 193 in its retracted position. After the mold 333 has been closed by the action of the cam tracks on the cam followers 127, the cam follower 236 for the actuator 235 of the control valve 359 engages a cam 365 which corresponds to the cam 353, and the valve member 360 is shifted to its outermost position wherein air is introduced into the cylinder 205 through the pipe 224 and air is vented from the cylinder 205 through the pipe 221. This effects the injection of the blow needle 193 through the clamped off section of the tube 294 and the blowing of the tube to conform to the internal configuration of the mold 333.

After the blow molding of the article within the mold 333 has been accomplished, the upstanding members 352 of the insert units 344 engage a fixed cam 367 to shift the insert units 344 to the left, as is shown in FIGURE 42, with the result that the pinched-off portion of the tube is severed from the blown article, and cooling air is blasted into the article and out through the vent opening 358. While the upstanding members 352 are still riding on the cam 367, the cam follower 236 engages a second cam 366 which moves the valve member 360 to a neutral position wherein there is no more air flow through the pipes 221 and 224. After the mold 333 passes the cam 367, the insert units 344 are returned to their normal positions by the action of the springs 354 thereof.

The blow molding operation having been accomplished, the blow needle 193 may be retracted, when desired. To this end, there is provided a cam 368, which corresponds to the cam 256, for moving the valve member 360 to its initial position at the top of FIGURE 42 wherein air is introduced into the cylinder 205 through pipe 221 and the cylinder 205 is vented through the pipe 224.

The discharging of the blown article from the mold 333 will be the same as that described with respect to the discharging of the article from the mold 143.

It will be readily apparent that each mold 143 is suitable for forming but a single article. It is, however, apparent that molds may be interchanged on the mounting pads 129 and 130. This makes it feasible to utilize the same mold supports for a plurality of different molds. Such an arrangement, however, is not suitable where a small mold is to be substituted for a large mold in that not only is the production of the molding machine not sufficiently great for the particular article, but there is also a great waste of plastic tubing of which it is the purpose of this invention to avoid. Accordingly, in order to increase the versatility of the blow molding machine 50, the machine will be provided with interchangeable sets of mold supports as well as interchangeable sets of molds. When it is desired to convert the molding machine from one size article or bottle to another size, the paddle wheel 78 will be stripped of all the molding support components including the yokes 95 and all of this mechanism will be replaced by like mechanism of a larger or smaller size in accordance with the mold change being made. At this time it is pointed out that the several manifolds carried by the paddle wheel will have sufficient fittings for hoses extending therefrom to accommodate the maximum number of molds for which the molding machine 50 is intended.

The mounting of the mold halves within the mold carriers or supports of the molding machine 50 is of such a nature wherein alignment of the mold halves of each mold is, for all practical purposes, assured. However, in order to positively assure alignment of the mold halves of a mold when they are being mounted, each mold half 141 is provided with a pair of diagonally disposed aligning pins 369 which are received in corresponding openings 370. It is to be understood that the mold halves 334 and 335 may be similarly constructed. The particular relationship of an aligning pin 369 and its respective opening 370 is clearly shown in FIGURE 19.

Although only preferred embodiments of the invention have been specifically illustrated and described herein, it is to be understood that other minor modifications may be made in the invention within the spirit and scope thereof, as defined in the appended claims.

We claim:

1. A blow molding machine associated with a tubing extruder for extruding tubing in a straight line, comprising a plurality of molds for receiving the tubing, and means mounting said molds for movement along a continuous path including a straight line portion generally coincidental with the line of movement of the tubing, said mounting means including a moving rigid frame supporting all of said molds.

2. A blow molding machine associated with a tubing extruder for extruding tubing in a straight line comprising, a plurality of molds for receiving the tubing, mounting means rotating about a central axis and mounting said molds for movement around said central axis, and guide means guiding said molds for generally radial movement relative to said mounting means and along a straight line generally coincidental with the line of movement of the tubing.

3. A blow molding machine associated with a tubing extruder for extruding tubing in a straight line comprising, a plurality of molds for receiving the tubing, mounting means rotating about a central axis and mounting said molds in normally circumferentially spaced relation for movement around said central axis, and guide means guiding said molds for generally radial movement relative to said mounting means and along a straight line generally coincidental with the line of movement of the tubing with said molds being in closely spaced relation along said straight line whereby there will be a minimum of waste tubing between adjacent molds.

4. A blow molding machine associated with a tubing extruder for extruding tubing in a straight line, comprising a plurality of molds for receiving the tubing, a pair of rotatably mounted spaced parallel frame members, a mold support for each mold extending between said frame members, said frame members having means disposed in circumferentially spaced relation mounting said mold supports for generally radial sliding movement relative to said frame members, and guide means for effecting the guiding of said molds during the rotation of said frame members and for movement relative to said frame members along a straight line generally coincidental with the line of movement of the tubing.

5. A blow molding machine associated with a tubing extruder for extruding tubing in a straight line, comprising a plurality of molds for receiving the tubing, a pair of rotatably mounted spaced parallel frame members, a mold support for each mold extending between said frame members, said frame members having means disposed in circumferentially spaced relation mounting said mold supports for generally radial sliding and swinging movement relative to said frame members, and guide means for effecting the guiding of said molds during the rotation of said frame members and for movement relative to said frame members along a straight line generally coincidental with the line of movement of the tubing and into closely spaced relation whereby there will be a minimum of waste tubing between adjacent molds.

6. The machine of claim 4 together with cooperating means on said frame members and said mold support mounting means for the interchangeable mounting of said mold support mounting means, said mold supports and said molds at different spacings.

7. A molding machine comprising a pair of spaced parallel frame members joined together for rotation about an axis in unison, said frame members having like circular mounting surfaces, a plurality of evenly spaced brackets mounted on said mounting surfaces, releasably cooperating means between said frame members and said brackets securing said brackets to said frame members in readily adjustable positions whereby said brackets are interchangeable and the spacing of brackets is variable, the brackets of said frame members being in transverse alignment, a mold support carried by each transversely aligned pair of said brackets, and a mold carried by said mold support.

8. The molding machine of claim 7 wherein said cooperating means includes an annular T-shaped cross sectional groove formed in each frame member, and T-headed bolts having the heads thereof seated in said groove.

9. The molding machine of claim 7 wherein said cooperating means includes an annular T-shaped cross sectional groove formed in each frame member, and T-headed bolts having the heads thereof seated in said groove, and spacers extending between adjacent brackets maintaining the spacing between adjacent brackets.

10. A blow molding machine associated with a tubing extruder for extruding tubing in a straight line, comprising a plurality of molds for receiving the tubing, a pair of spaced parallel frame members mounted for rotation in unison about an axis, said frame members having mold mounting means including circumferentially spaced and transversely aligned pairs of radially extending slots, a plurality of mold support shafts extending between said frame members, each support shaft having a mounting block at each end thereof freely slidably mounted in a respective one of said slots, a pair of complementary mold halves carried by each support shaft, a guide track disposed adjacent at least one of said frame members, and at least one follower carried by each support shaft engaging said guide track and positioning the respective support shaft relative to said frame members as said frame members rotate.

11. The machine of claim 10 wherein said guide track includes a straight portion disposed parallel to the line of movement of the tubing.

12. The machine of claim 10 wherein said blocks are rotatably mounted on said support shafts for swinging of said molds towards and away from one another whereby said molds are more closely related when aligned with the line of movement of the tubing.

13. The machine of claim 10 wherein said blocks are rotatably mounted on said support shafts in eccentric relation to the centers of said support shafts for swinging of said molds towards and away from one another whereby said molds are more closely related when aligned with the line of movement of the tubing.

14. A blow molding machine associated with a tubing extruder for extruding tubing in a straight line, comprising a plurality of molds for receiving the tubing, a pair of spaced parallel frame members mounted for rotation in unison about an axis, said frame members having mold mounting means including circumferentially spaced and transversely aligned pairs of radially extending slots, a plurality of mold support shafts extending between said frame members, each support shaft having a mounting block at each end thereof freely slidably mounted in a respective one of said slots, a pair of complementary mold halves carried by each support shaft for sliding movement, sleeves carried by opposite end portions of each support shaft, mold control shafts mounted within said sleeves for sliding movement between a mold closing position and a mold opening position and being connected to said mold halves, cam means disposed adjacent said frame members, means connected to said control shafts cooperating with said cam means, a guide track disposed adjacent at least one of said frame members, and at least one follower carried by each support shaft engaging said guide track and positioning the respective support shaft relative to said frame members as said frame members rotate.

15. The machine of claim 14 wherein said guide track includes a straight portion disposed parallel to the line of movement of the tubing.

16. The machine of claim 14 wherein said blocks are rotatably mounted on said support shafts for swinging of said molds towards and away from one another whereby said molds are more closely related when aligned with the line of movement of the tubing.

17. The machine of claim 14 together with lock means disposable between said sleeves and said mold halves for retaining said mold halves in a closed position.

18. The machine of claim 14 wherein each of said cam means includes at least two cam tracks, one cam track being a mold opening cam track and the other cam track being a mold closing cam track.

19. The machine of claim 14 wherein each of said cam means includes at least two cam tracks, one cam track being a mold opening cam track and the other cam track being a mold closing cam track, and each of said means connected to said control shaft and cooperating with said cam means including separate followers each engageable with one of said two cam tracks.

20. The machine of claim 14 wherein there is a compressible connection between one mold half of each pair of mold halves and its respective control shaft whereby closing of said mold halves at a predetermined pressure is assured.

21. The machine of claim 14 wherein each control shaft has a mold half mounting plate secured thereto, and said mold halves have fasteners releasably securing the same to said mounting plates whereby molds may be interchanged.

22. The machine of claim 14 wherein each control shaft has a mold half mounting plate secured thereto, and said mold halves have fasteners releasably securing the same to said mounting plates whereby molds may be interchanged, said mounting plates having said support shafts passing therethrough.

23. The machine of claim 14 wherein said follower is mounted on said sleeve.

24. A mold support unit for a molding machine comprising a support shaft, a pair of mold half mounting plates slidably mounted on intermediate portions of said support shaft, sleeves carried by end portions of said support shaft, control shafts slidably mounted in said sleeves for movement parallel to said support shaft, inner ends of said control shafts being secured to said mounting plates for effecting the sliding movement thereof on said support shaft, and cam track engageable means connected to said control shafts for effecting the movement and positioning thereof.

25. The mold support unit of claim 24 wherein one of said mounting plates carries an intermediate plate to which a mold half may be directly secured, and there is a compressible connection between said one mounting plate and said intermediate plate.

26. The mold support unit of claim 24 wherein each end of said support shaft is provided with a fitting eccentrically mounted for rotation.

27. The mold support unit of claim 24 together with lock means disposable between said sleeves and said mounting plates for retaining said mounting plates and said control shafts in mold closing positions.

28. The mold support unit of claim 24 together with lock means disposable between said sleeves and said mounting plates for retaining said mounting plates and said control shafts in mold closing positions, said lock means including a rotatable ring having at least one finger disposed generally parallel to a respective control shaft and normally overlapping a respective sleeve, and an endwise facing abutment on said sleeve for engagement by an end of said finger.

29. The mold support unit of claim 24 together with lock means disposable between said sleeves and said mounting plates for retaining said mounting plates and said control shafts in mold closing positions, said lock means including a rotatable ring having at least one finger disposed generally parallel to a respective control shaft and normally overlapping a respective sleeve, an endwise facing abutment on said sleeve for engagement by an end of said finger, a spring urging said finger towards alignment with said abutment, and stop means for limiting rotation of said finger by said spring a position aligned with said abutment.

30. The mold support unit of claim 24 wherein said sleeves are each provided with a pair of guide track followers mounted generally in diametrically opposite relation and generally normal to a plane passing through the axes of said support shaft and said control shafts.

31. A blow molding machine of the type having a predetermined axis of rotation, means mounting a plurality of molds generally for rotation about said axis and for opening and closing movement parallel to said axis with a portion of the path of movement of said molds at the point of opening of said molds being a generally straight line, and means in the normal path of the molds if unopened and generally centered with respect to said molds for removing molded articles from said molds.

32. The machine of claim 31 wherein said article removing means includes a chute and an air blast nozzle for blowing articles into said chute.

33. The machine of claim 31 wherein said article removing means includes a chute, said chute including a section mounted for swinging movement in the direction of mold travel whereby when an article becomes jammed between one of said molds and said chute said chute section is swingable to prevent damage.

34. The machine of claim 31 wherein said article removing means includes a chute, said chute including a section mounted for swinging movement in the direction of mold travel whereby when an article becomes jammed between one of said molds and said chute said chute section is swingable to prevent damage, and a machine operation controlling switch controlled by the position of said chute section.

35. The machine of claim 31 wherein said article removing means includes a chute having article stripping means at one side thereof.

36. The machine of claim 31 wherein each mold includes a pair of mold halves, one of said mold halves having a knock-out pin for stripping an article therefrom, and said article removing means including a stripper for removing an article from the other of said mold halves.

37. The machine of claim 31 wherein each mold includes a pair of mold halves, one of said mold halves having a knock-out pin for stripping an article therefrom, and said article removing means including a stripper for removing an article from the other of said mold halves, said stripper being carried by a centrally located article receiving chute.

38. A blow molding machine associated with a tubing extruder for extruding tubing in a straight line, comprising a plurality of molds for receiving the tubing, a rotating rigid frame member and means mounting all of said molds on said frame for movement therewith along a continuous path including a straight line portion generally coincidental with the line of movement of the tubing and a second straight line portion to facilitate the removal of molded articles.

39. A mold unit for a molding machine comprising a support shaft, a pair of mold half mounting plates slidably mounted on intermediate portions of said support shaft, sleeves carried by end portions of said support shaft, control shafts slidably mounted in said sleeves for movement parallel to said support shaft, inner ends of said control shafts being secured to said mounting plates for effecting the sliding movement thereof on said support shaft, cam track engageable means connected to said control shafts for effecting the movement and positioning thereof, a mold half releasably carried by each of said mounting plates, one of said mold halves being provided with a projectable blow needle, and a single valve mechanism for controlling the position of said needle and the flow of fluid therethrough.

40. The mold unit of claim 39 wherein said needle is carried by a piston mounted in a cylinder with said piston and cylinder being parts of a double acting motor, and said piston having a passage therethrough aligned with said needle whereby fluid introduced into one end of said cylinder reacts on said piston to project said needle and flows through said needle.

41. The mold unit of claim 39 wherein said valve mechanism includes a mounting bracket, a spool valve carried by said mounting bracket, and an operator connected to said spool valve and carrying a follower for engaging a cam track whereby said valve mechanism may be automatically actuated.

42. The mold unit of claim 39 wherein said valve mechanism has a position for venting fluid through said needle prior to the retraction of said needle.

43. The mold unit of claim 39 wherein said mold halves have cooperating tube clamping means for sealing off a tube section received by said mold halves, and means on said mold halves adjacent said blow needle on the side thereof remote from the interior of said mold halves for removing a clamped end of a tube section whereby venting of a blown article within said mold through an open end of the article is facilitated.

44. A mold unit for a molding machine comprising a support shaft, a pair of mold half mounting plates slidably mounted on intermediate portions of said support shaft, sleeves carried by end portions of said support shaft, control shafts slidably mounted in said sleeves for movement parallel to said support shaft, inner ends of said control shafts being secured to said mounting plates for effecting the sliding movement thereof on said support shaft, cam track engageable means connected to said control shafts for effecting the positioning thereof, a mold half releasably carried by each of said mounting plates, one of said mold halves being provided with a projectable blow needle, and a valve mechanism for controlling the position of said needle and the flow of fluid therethrough, said mold halves having cooperating tube clamping means for sealing off a tube section received by said mold halves, and means on said mold halves adjacent said blow needle for removing a clamped end of a tube section whereby venting of a blown article within said mold through an open end of the article is facilitated, said last mentioned means including movable end portions of said mold halves, said end portions defining one of said tube clamping means.

45. A mold unit for a molding machine comprising a support shaft, a pair of mold half mounting plates slidably mounted on intermediate portions of said support shaft, sleeves carried by end portions of said support shaft, control shafts slidably mounted in said sleeves for movement parallel to said support shaft, inner ends of said control shafts being secured to said mounting plates for effecting the sliding movement thereof on said support shaft, cam track engageable means connected to said control shafts for effecting the positioning thereof, a mold half releasably carried by each of said mounting plates, one of said mold halves being provided with a projectable blow needle, and a valve mechanism for controlling the position of said needle and the flow of fluid therethrough, said mold halves having cooperating tube clamping means for sealing off a tube section receiving by said mold halves, and means on said mold halves adjacent said blow needle for removing a clamped end of a tube section whereby venting of a blown article within said mold through an open end of the article is facilitated, said last mentioned means including movable end portions of said mold halves, said end portions defining one of said tube clamping means, and said end portions including an inner cutting edge to effect a cutting of a tube.

46. A mold unit for a molding machine comprising a support shaft, a pair of mold half mounting plates slidably mounted on intermediate portions of said support shaft, sleeves carried by end portions of said support shaft, control shafts slidably mounted in said sleeves for movement parallel to said support shaft, inner ends of said control shafts being secured to said mounting plates for effecting the sliding movement thereof on said support shaft, cam track engageable means connected to said control shafts for effecting the positioning thereof, a mold half releasably carried by each of said mounting plates, one of said mold halves being provided with a projectable blow needle, and a valve mechanism for controlling the position of said needle and the flow of fluid therethrough, said mold halves having cooperating tube clamping means for sealing off a tube section received by said mold halves, and means on said mold halves adjacent said blow needle for removing a clamped end of a tube section whereby venting of a blown article within said mold through an open end of the article is facilitated, said last mentioned means including movable end portions of said mold halves, said end portions defining one of said tube clamping means, and a vent opening in said end portions alignable with a newly formed article.

47. A blow molding machine associated with a tubing extruder for extruding tubing in a straight line, said blow molding machine comprising a rigid frame, means mounting said frame for rotation about a single axis, a plurality of molds, support means mounting said molds on said frame for generally radial movement and for opening and closing movement, cam means cooperating with said mold support means for radially positioning said molds and for diverting said molds from a normally circular path to a straight line path generally coincidental with the line of movement of the tubing.

48. A blow molding machine associated with a tubing extruder for extruding tubing in a straight line, said blow molding machine comprising a rigid frame, means mounting said frame for rotation about a single axis, a plurality of molds, support means mounting said molds on said frame for generally radial movement and for opening and closing movement, cam means cooperating with said mold support means for radially positioning said molds and for diverting said molds from a normally circular path to a straight line path generally coincidental with the line of movement of the tubing in timed relation as said frame rotates.

49. A blow molding machine associated with a tubing extruder for extruding tubing in a straight line, said blow molding machine comprising a rigid frame, means mounting said frame for rotation about a single axis, a plurality of molds, support means mounting said molds on said frame for generally radial movement and for opening and closing movement, cam means cooperating with said mold support means for radially positioning said molds and for diverting said molds from a normally circular path to a straight line path generally coincidental with the line of movement of the tubing, said cam means including a fixed cam track with the paths of movement of each mold being repetitious.

References Cited by the Examiner
UNITED STATES PATENTS

| | | | |
|---|---|---|---|
| 2,515,093 | 7/1950 | Mills | 264—96 X |
| 2,750,625 | 6/1956 | Columbo | 18—5 |
| 2,954,581 | 10/1960 | Columbo | 18—5 |
| 3,020,595 | 2/1962 | Szajna | 18—5 X |
| 3,021,559 | 2/1962 | Strong | 18—5 X |
| 3,025,561 | 3/1962 | Ruekberg et al. | 18—5 |
| 3,035,302 | 5/1962 | Lysobey | 18—5 X |
| 3,069,725 | 12/1962 | Root | 18—20 X |
| 3,102,304 | 9/1963 | Divers | 18—20 |
| 3,114,931 | 12/1963 | Pelikan | 18—5 X |
| 3,146,491 | 9/1964 | Eyquem | 18—5 |
| 3,212,130 | 10/1965 | Elphee | 18—5 |
| 3,218,669 | 11/1965 | Barker | 18—5 |

J. SPENCER OVERHOLSER, *Primary Examiner.*

MICHAEL V. BINIDISI, *Examiner.*

W. L. McBAY, *Assistant Examiner.*